(12) United States Patent
Santoro et al.

(10) Patent No.: US 11,624,866 B2
(45) Date of Patent: Apr. 11, 2023

(54) NARROW APERTURE LUMINAIRES AND LIGHT GUIDES THEREFOR

(71) Applicant: LMPG Inc., Surrey (CA)

(72) Inventors: Scott Santoro, Delta (CA); Kenton Keng Ting Wong, Burnaby (CA)

(73) Assignee: LMPG INC., Longueuil (CA)

( * ) Notice: Subject to any disclaimer, the term of this patent is extended or adjusted under 35 U.S.C. 154(b) by 0 days.

(21) Appl. No.: 17/475,134

(22) Filed: Sep. 14, 2021

(65) Prior Publication Data

US 2022/0107455 A1    Apr. 7, 2022

Related U.S. Application Data

(60) Provisional application No. 63/086,458, filed on Oct. 1, 2020.

(51) Int. Cl.
| | |
|---|---|
| *F21V 8/00* | (2006.01) |
| *F21V 11/00* | (2015.01) |
| *F21V 15/01* | (2006.01) |
| *F21W 131/402* | (2006.01) |

(52) U.S. Cl.
CPC ............ *G02B 6/0036* (2013.01); *F21V 11/00* (2013.01); *G02B 6/002* (2013.01); *G02B 6/003* (2013.01); *G02B 6/0073* (2013.01); *F21V 15/01* (2013.01); *F21W 2131/402* (2013.01)

(58) Field of Classification Search
CPC ..... G02B 6/0036; G02B 6/003; G02B 6/0073
See application file for complete search history.

(56) References Cited

U.S. PATENT DOCUMENTS

| | | | | |
|---|---|---|---|---|
| 7,286,296 | B2* | 10/2007 | Chaves | F21S 41/285 257/E33.071 |
| 9,442,240 | B2* | 9/2016 | Chang | G02B 6/0061 |
| 10,215,344 | B2* | 2/2019 | Santoro | F21K 9/61 |
| 10,627,560 | B2* | 4/2020 | Gloss | F21S 43/243 |
| 2017/0136942 | A1 | 5/2017 | Wu | |
| 2018/0202646 | A1* | 7/2018 | Dau | G02B 6/0045 |
| 2019/0154228 | A1* | 5/2019 | Xiang | F21S 41/285 |
| 2019/0309931 | A1 | 10/2019 | Ng et al. | |

FOREIGN PATENT DOCUMENTS

| | | |
|---|---|---|
| EP | 3354977 A1 | 8/2018 |
| WO | 2012026144 A1 | 3/2012 |

\* cited by examiner

*Primary Examiner* — Oluseye Iwarere
*Assistant Examiner* — Michael Chiang
(74) *Attorney, Agent, or Firm* — Oyen Wiggs Green & Mutala LLP

(57) ABSTRACT

A light guide for a luminaire is provided. The light guide includes: an elongated base comprising a light emitting surface at a distal end, and opposing major faces; and a plurality of collimators arranged in an adjacent manner and projecting in a proximal direction from the base, wherein each collimator has a light receiving surface at a proximal end, wherein each collimator expands laterally outwardly in a distal direction. Substantially all light received at the light receiving surfaces internally reflects through the collimators and the base and emits from the light emitting surface.

13 Claims, 26 Drawing Sheets

US 11,624,866 B2

NARROW APERTURE LUMINAIRES AND LIGHT GUIDES THEREFOR

TECHNICAL FIELD

This invention relates to luminaires with narrow apertures, and light guides for such luminaires.

BACKGROUND

Point sources of light such as light emitting diodes (LEDs) introduce flexibility but also challenges in the design of architectural luminaires. In some design contexts it is desirable to have luminaires with very narrow channels from which light exits. One challenge in designing such narrow aperture luminaires is minimizing high angle glare while simultaneously outputting sufficient light from the narrow aperture to illuminate a work space. Glare is an effect of luminance at high angles that can cause visual discomfort to users. Another challenge is providing aesthetically pleasing homogenous light at the exit surface, that is, light that appears to be uniform and "clean" despite the fact that the light is coming from point sources of light. Narrow aperture luminaires that reduce or eliminate high angle glare and provide homogenous light are desirable.

BRIEF DESCRIPTION OF DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
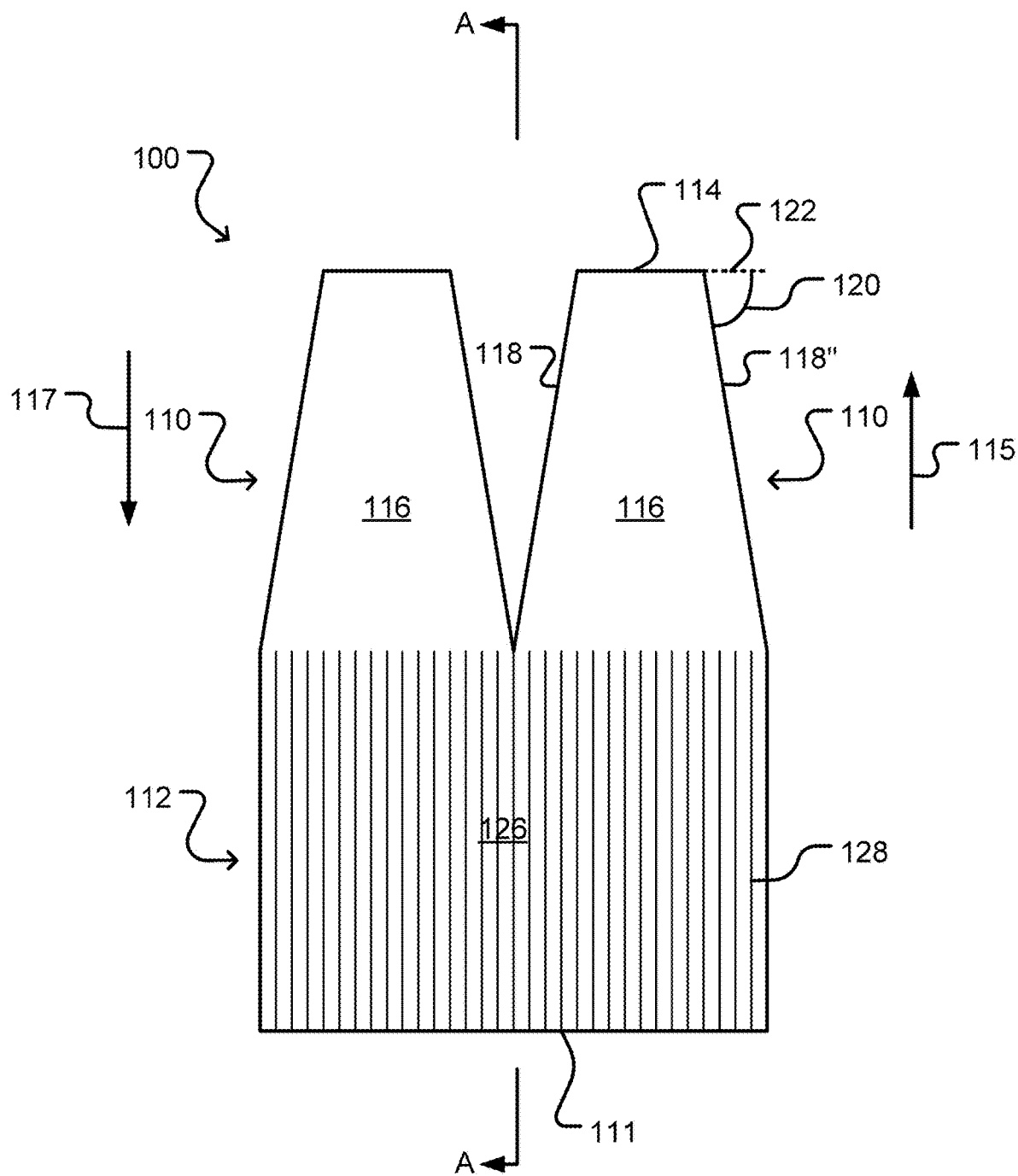
FIG. 1 is a front view of a light guide according to an embodiment.
Figure 2:
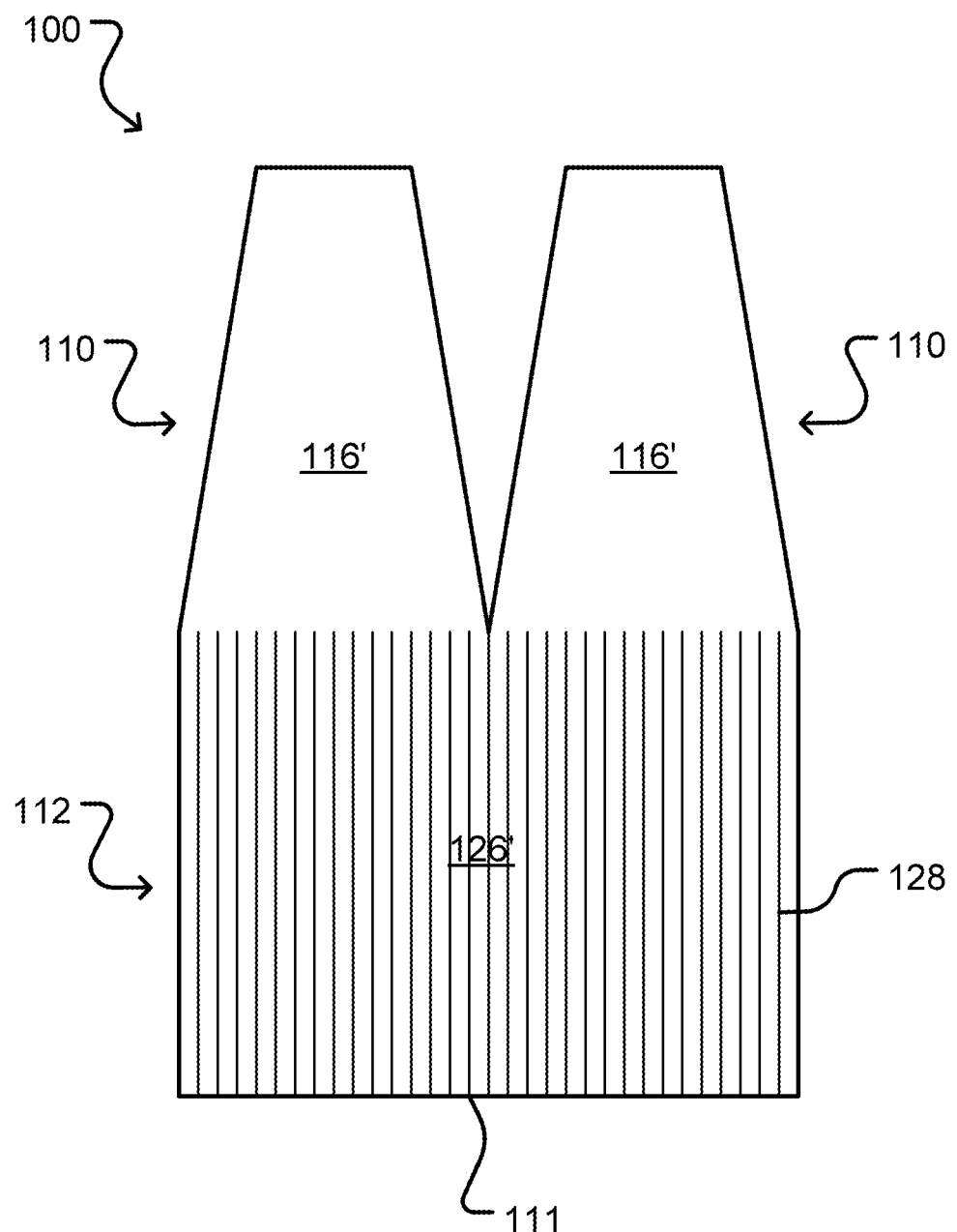
FIG. 2 is a rear view of a light guide according to the embodiment shown in FIG. 1.
Figure 3:
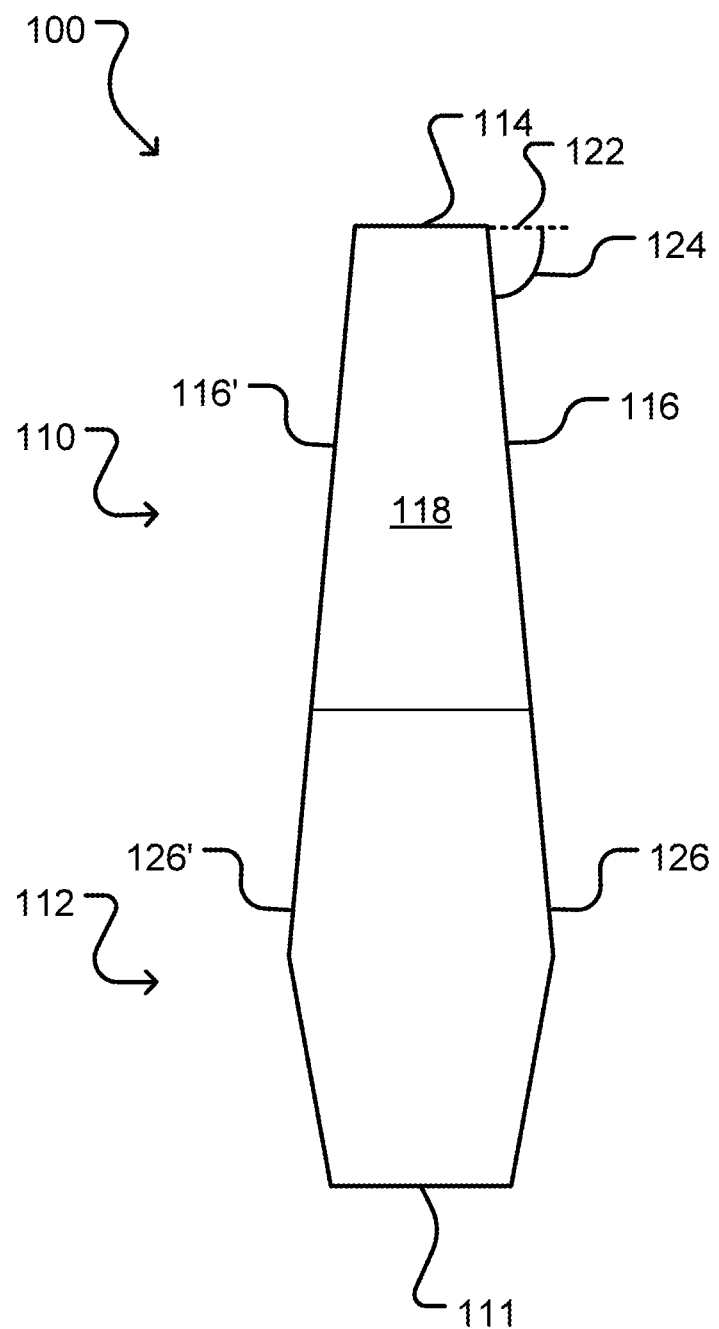
FIG. 3 is a side view of a light guide according to the embodiment shown in FIG. 1 taken along the cross section A-A in FIG. 1.

The term "proximal" as used herein with respect to features of the light guide means a position relatively closer to a plane defined by a light source for the light guide, and the term "distal" as used herein means a position relatively farther away from the plane defined by the light source for the light guide. Arrow 115 in FIG. 1 illustrates the proximal direction, and arrow 117 in FIG. 1 illustrates the distal direction.

The term "longitudinal" or "longitudinally" as used herein with respect to features of the light guide means a direction or orientation parallel to the proximal/distal axis, and the term "lateral" or "laterally" as used herein with respect to features of the light guide means a direction or orientation normal to the proximal/distal axis.

Aspects of the invention relate to light guides having a plurality of collimators projecting from an elongated base. The collimators reduce the angle of light. The base has flutes which homogenize light. Additional features described herein also reduce the angle of light and homogenize light. Aspects of the invention also relate to luminaires incorporating such light guides.

Figure 39:
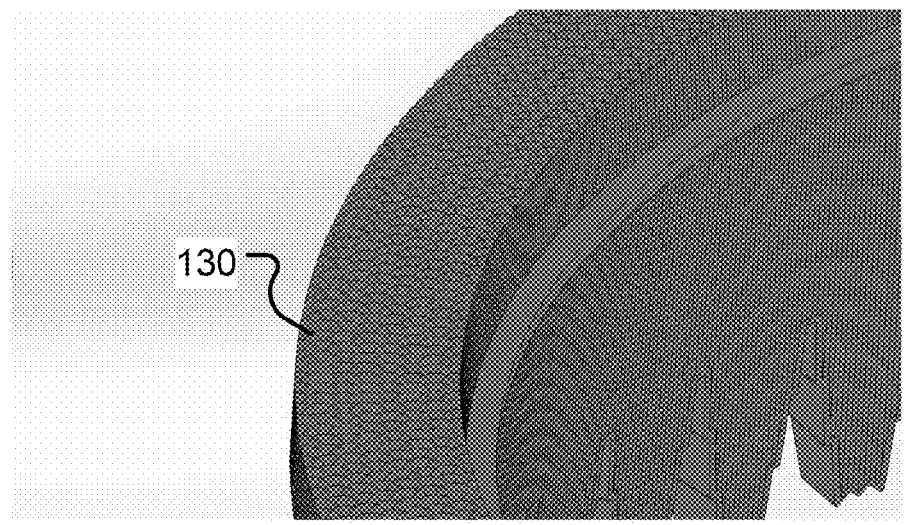
FIG. 39 is a partial bottom isometric view of a light guide according to an embodiment, showing the cross-hatched texture elements of the light emitting surface.
Figure 40A:
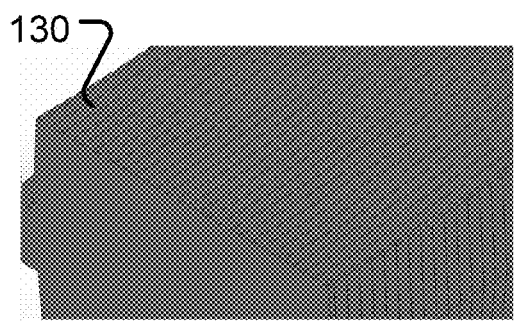
FIGS. 40A and 40B are partial bottom isometric views of light guides according to embodiments, showing circumferentially fluted and radially fluted texture elements of the light emitting surface.
Figure 40B:
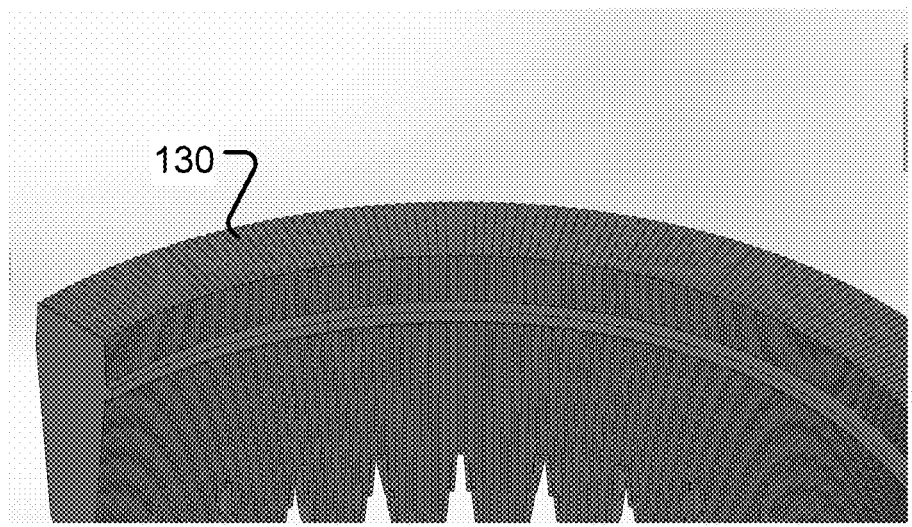

FIGS. 1 to 4 show a light guide 100 according to an embodiment of the invention. Light guide 100 has a plurality of collimators 110 and a laterally elongated base 112. Collimator 110 has a light receiving surface 114 at its proximal end. Base 112 has a light emitting surface 111 at its distal end. As described herein, substantially all light received at light receiving surface 114 of collimators 110 internally reflects through collimators 110 and base 112 and is emitted from light emitting surface 111. In some embodiments light emitting surface may comprise texture elements 130, for example dimples, bumps, flutes (e.g. running parallel or perpendicular to the lateral extent of base 112), or cross-hatched flutes, as shown for example in FIGS. 39, 40A and 40B.

Collimators 110 project from base 112 in a proximal direction 115. Collimators 110 are arranged in a side-by-side immediately adjacent manner along base 112. Collimators 110 and base 112 may be integrally formed and have a unitary structure.

Figure 5:
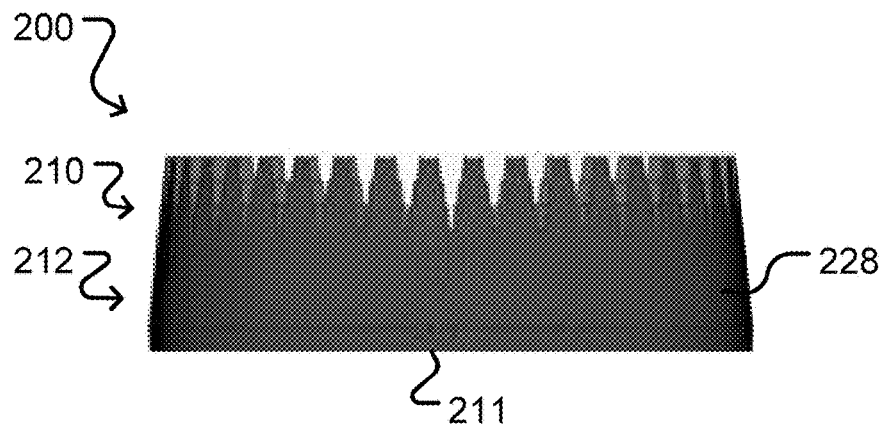
FIG. 5 is a front view of a light guide according to an embodiment.
Figure 6:
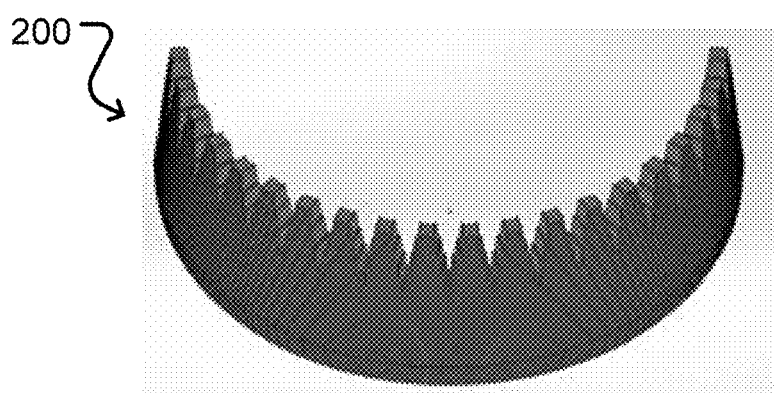
FIG. 6 is a top isometric view of a light guide according to the embodiment shown in FIG. 5.
Figure 7:
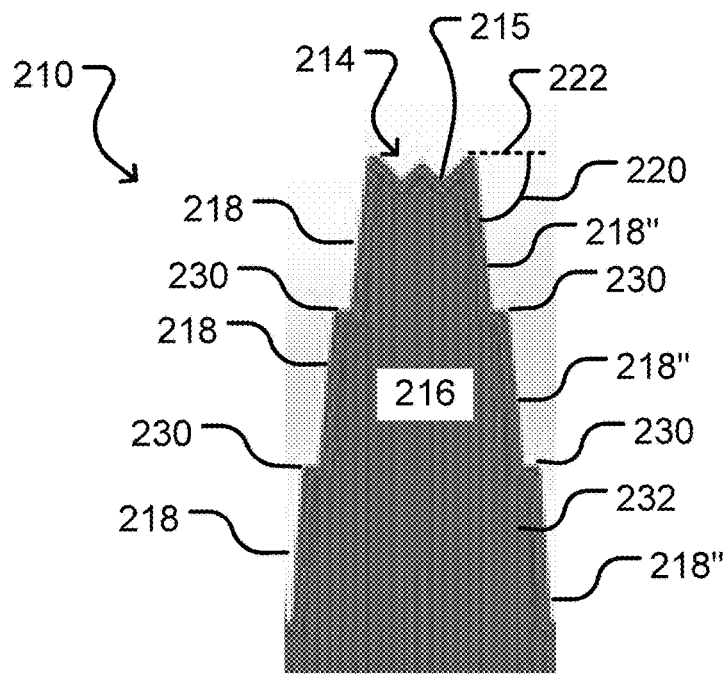
FIG. 7 is a close up front view of a collimator of a light guide according to the embodiment shown in FIG. 5.
Figure 8:
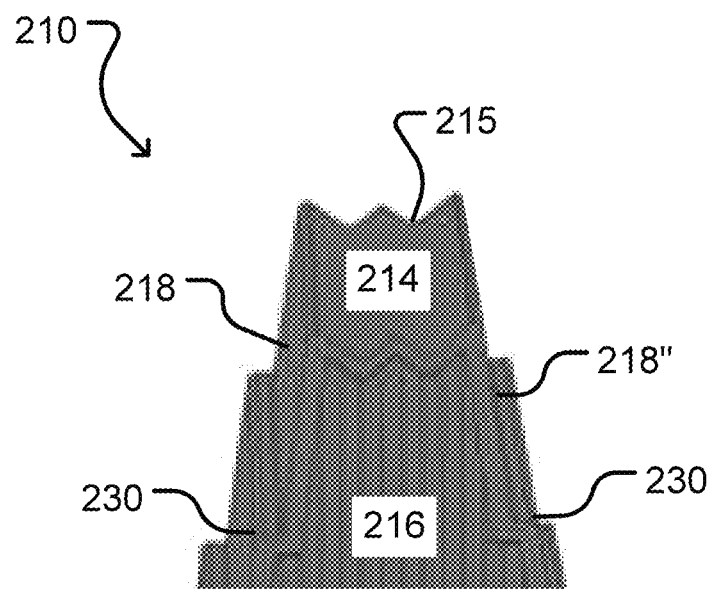
FIG. 8 is a close up partial top isometric view of a collimator of a light guide according to the embodiment shown in FIG. 5.
Figures 8A, 9:
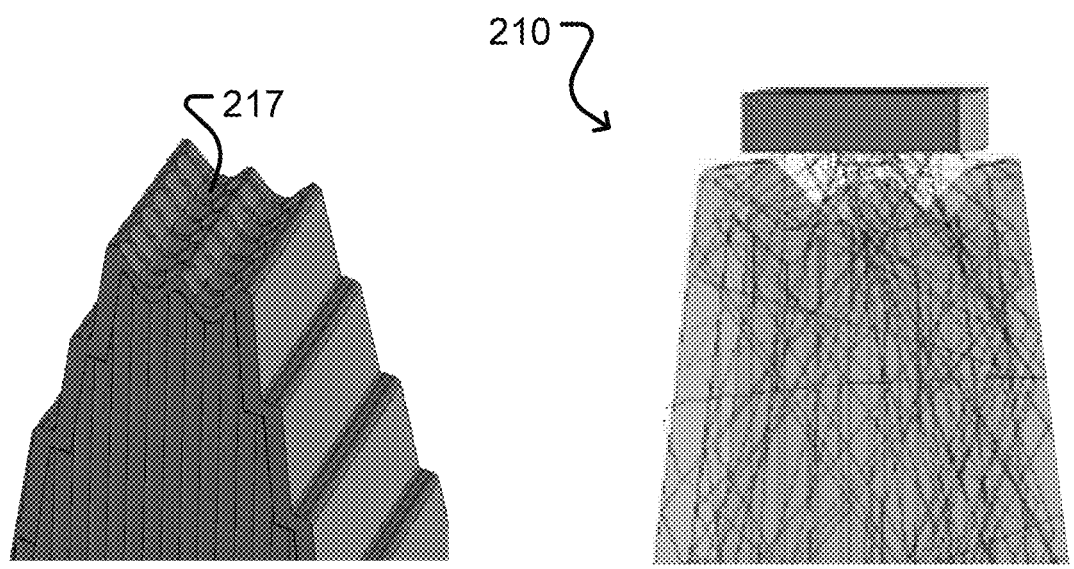
FIG. 8A is a close up partial top isometric view of a collimator of a light guide according to an embodiment.
FIG. 9 is a close up partial front view of a light source and a collimator of a light guide according to the embodiment shown in FIG. 5 with exemplary simulated light ray traces.
Figure 10:
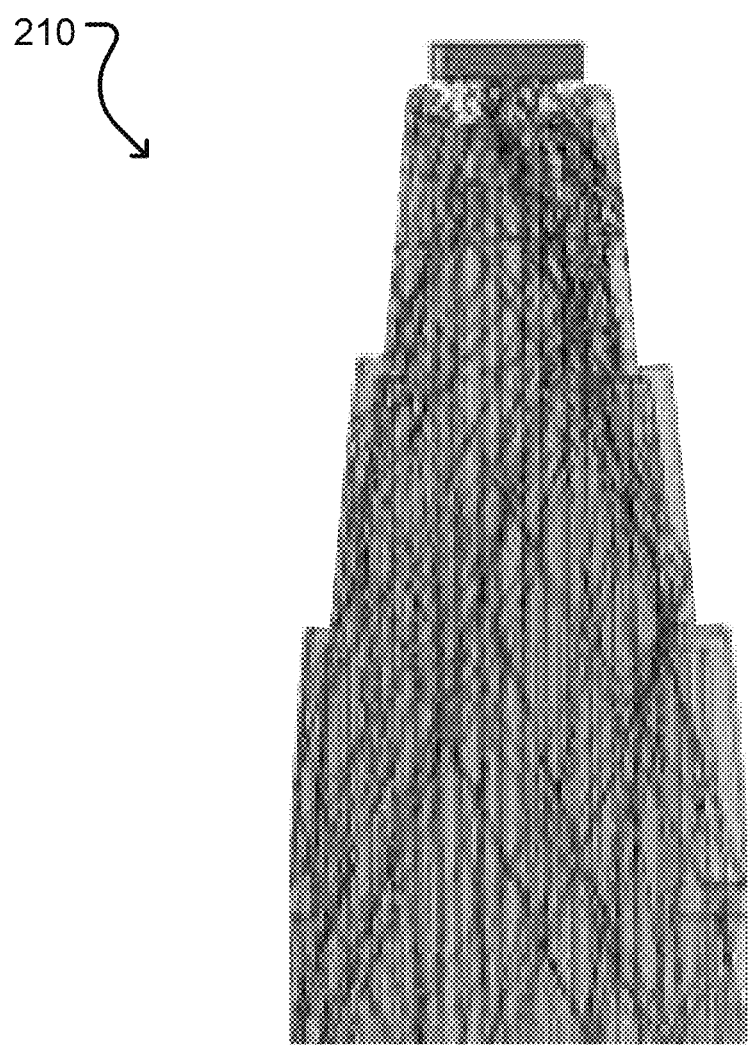
FIG. 10 is a front view of a light source and a collimator of a light guide according to the embodiment shown in FIG. 5 with exemplary simulated light ray traces.
Figure 11:
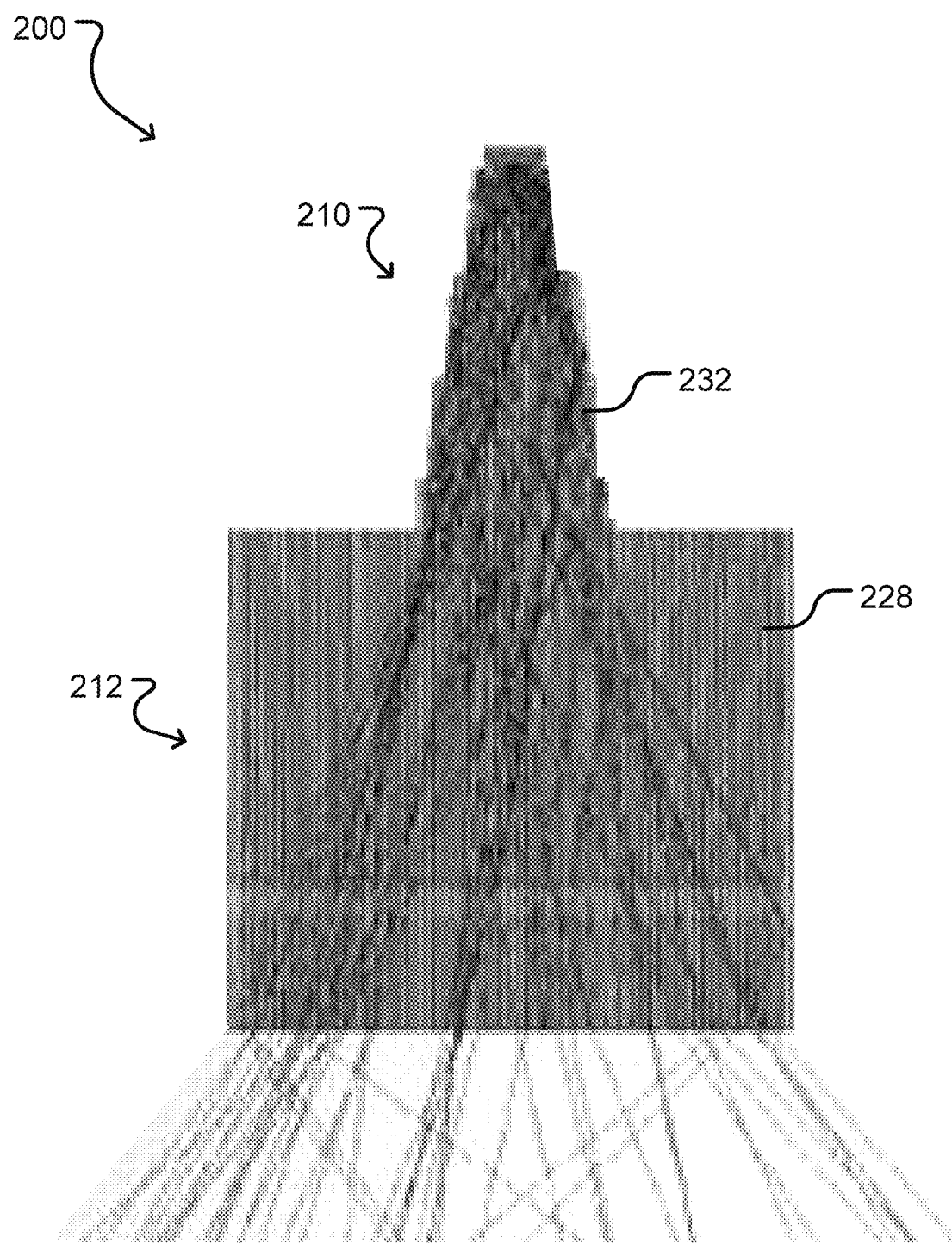
FIG. 11 is a front view of a light source and a light guide according to the embodiment shown in FIG. 5, showing for purposes of illustration a single collimator with exemplary simulated light ray traces.
Figure 12:
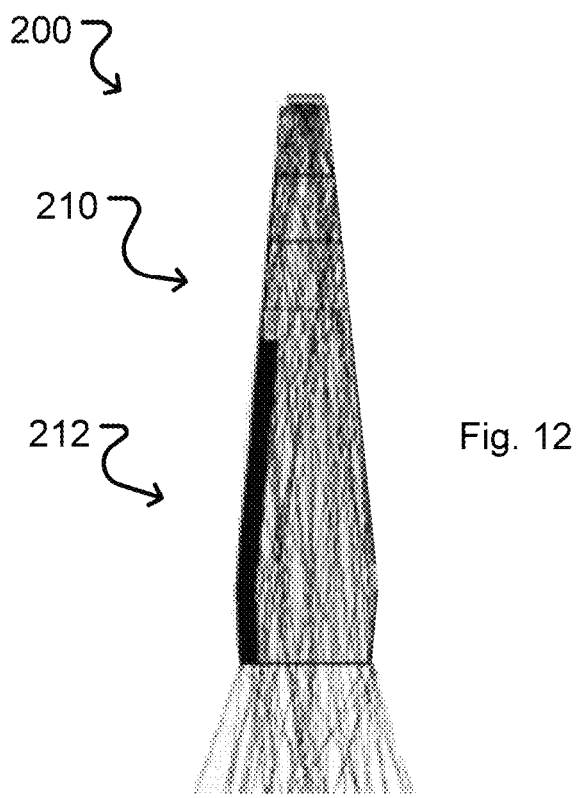
FIG. 12 is an cross sectional side view of a light source and a light guide according to the embodiment shown in FIG. 5, with exemplary simulated light ray traces (the solid black strip along the left of the light guide being an artefact that should be ignored).
Figure 15:
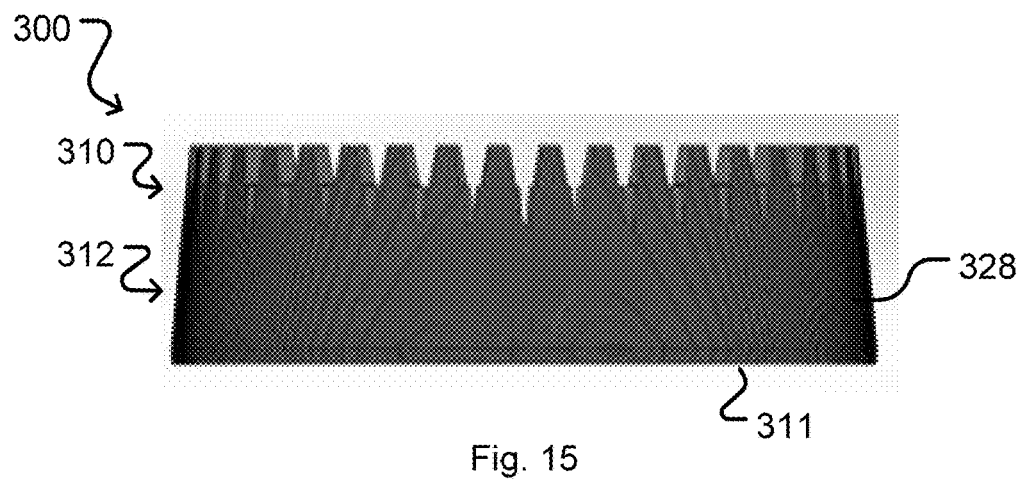
FIG. 15 is a front view of a light guide according to an embodiment.
Figure 16:
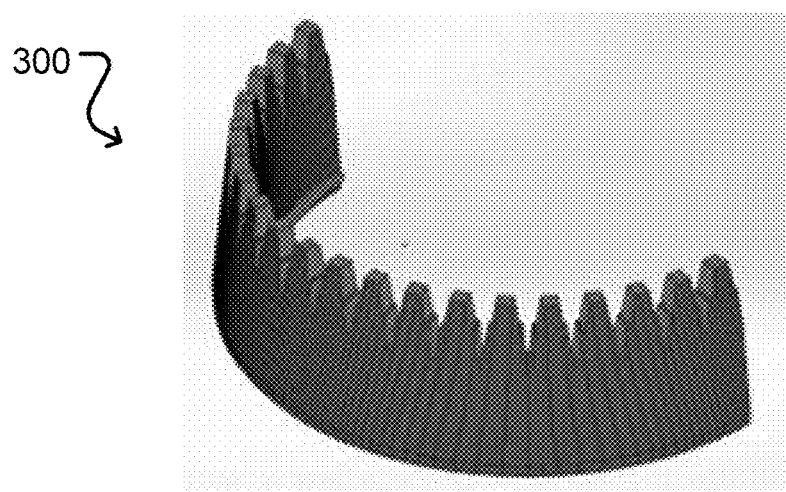
FIG. 16 is a top isometric view of a light guide according to the embodiment shown in FIG. 15.
Figure 17:
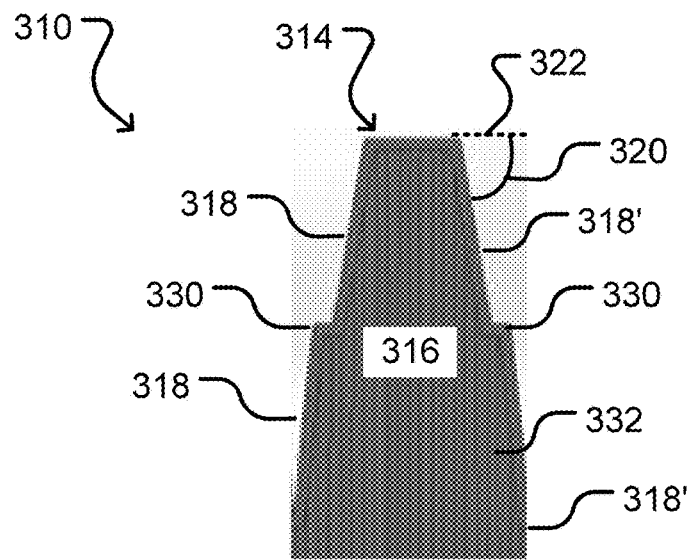
FIG. 17 is a close up front view of a collimator of a light guide according to the embodiment shown in FIG. 15.
Figure 18:
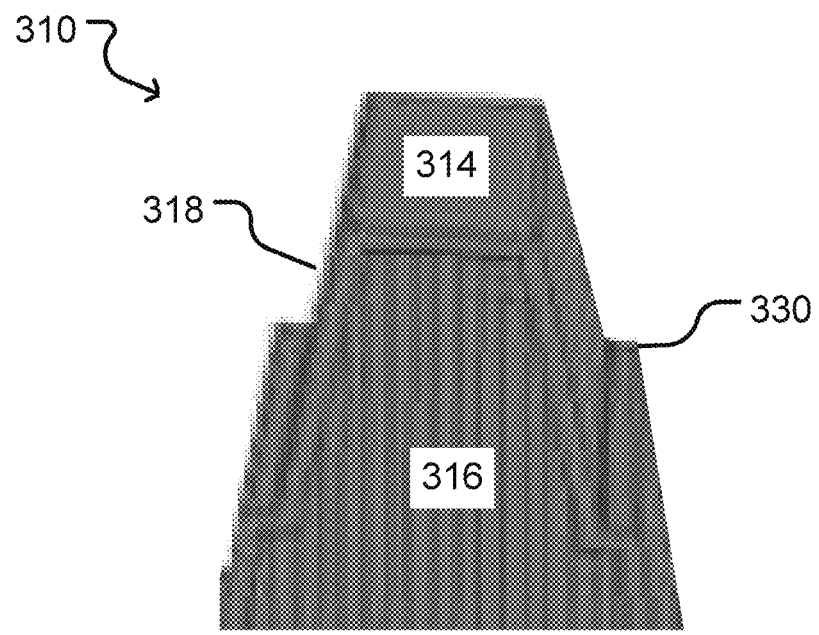
FIG. 18 is a close up partial top isometric view of a collimator of a light guide according to the embodiment shown in FIG. 15.
Figure 19:
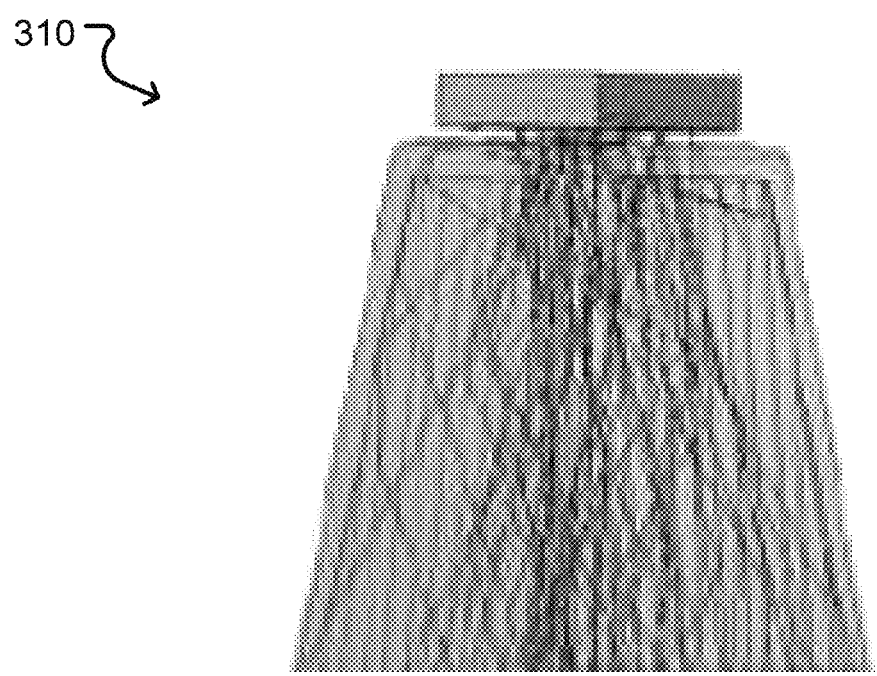
FIG. 19 is a close up partial front view of a light source and a collimator of a light guide according to the embodiment shown in FIG. 15 with exemplary simulated light ray traces.
Figure 20:
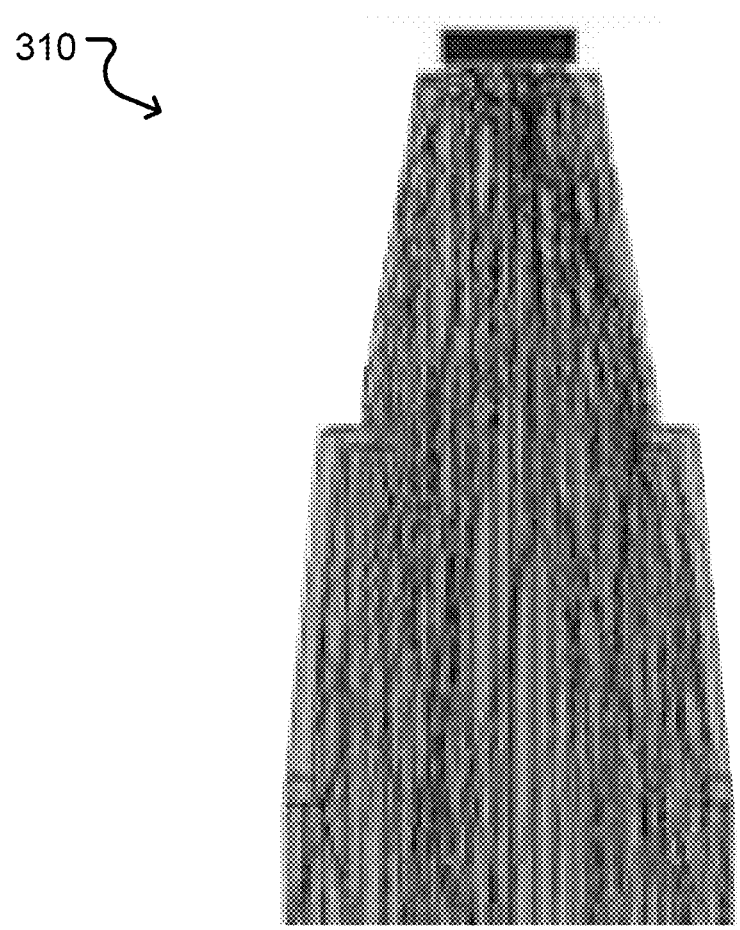
FIG. 20 is a front view of a light source and a collimator of a light guide according to the embodiment shown in FIG. 15 with exemplary simulated light ray traces.
Figure 21:
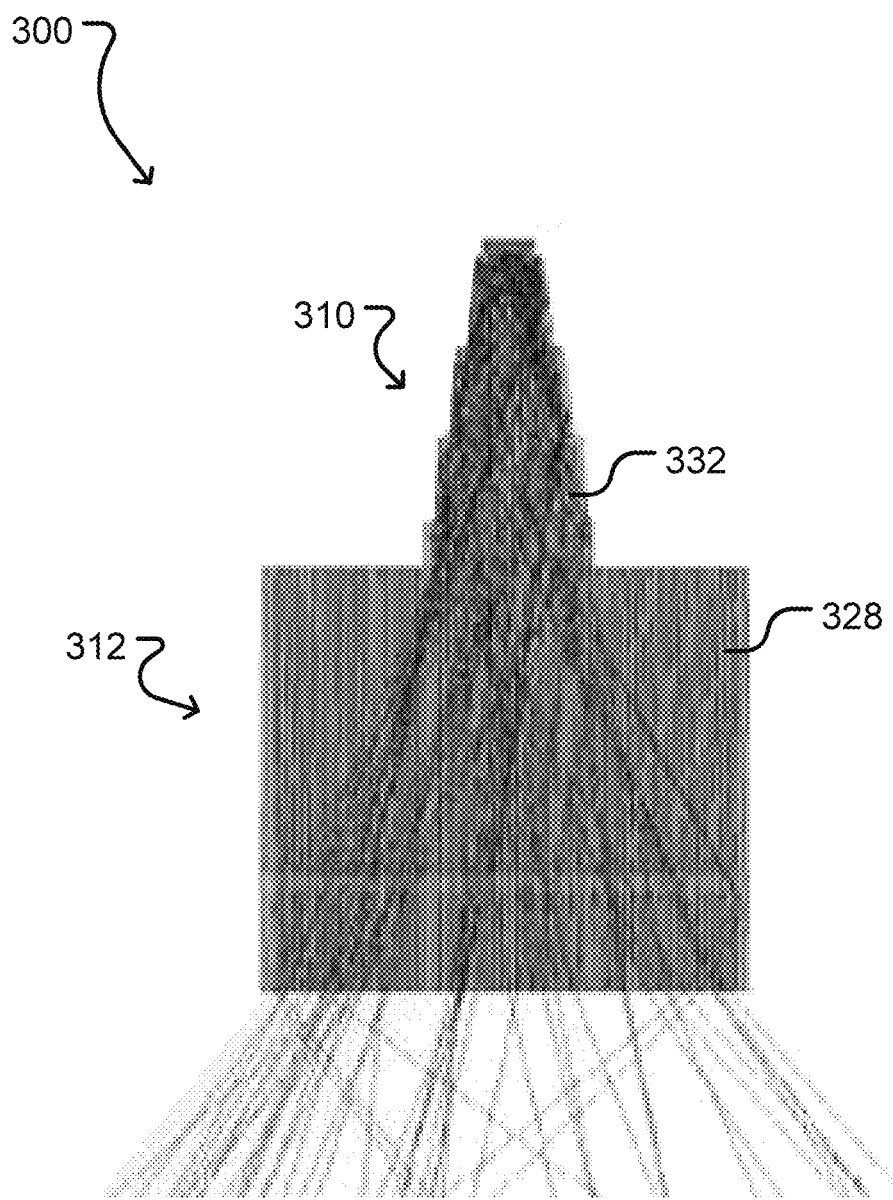
FIG. 21 is a front view of a light source and a light guide according to the embodiment shown in FIG. 15, showing for purposes of illustration a single collimator with exemplary simulated light ray traces.
Figure 22:
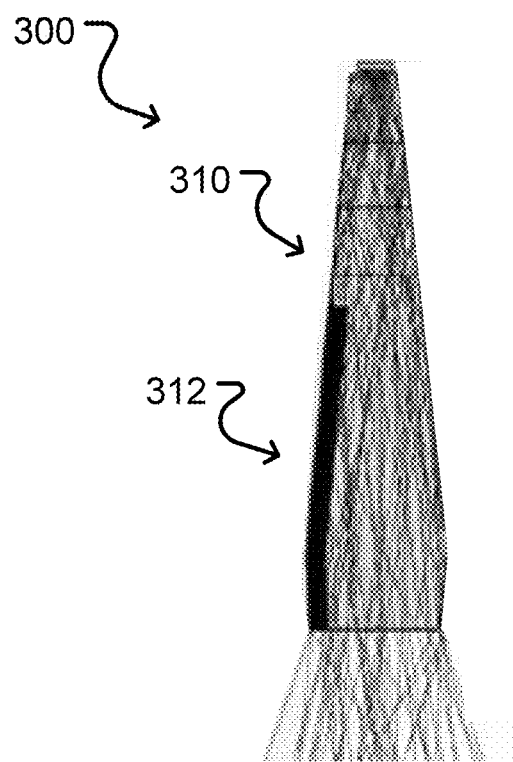
FIG. 22 is an cross sectional side view of a light source and a light guide according to the embodiment shown in FIG. 15, with exemplary simulated light ray traces (the solid black strip along the left of the light guide being an artefact that should be ignored).
Figure 25:
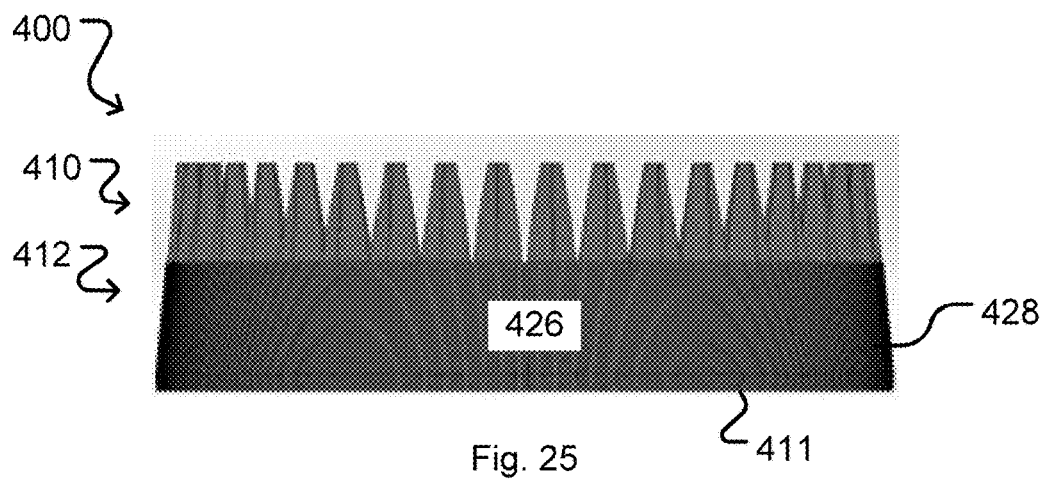
FIG. 25 is a front view of a light guide according to an embodiment.
Figure 26:
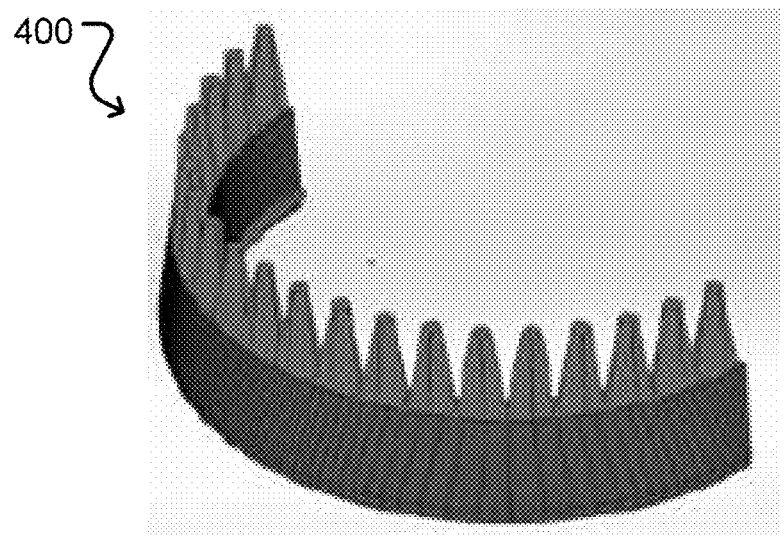
FIG. 26 is a top isometric view of a light guide according to the embodiment shown in FIG. 25.
Figure 27:
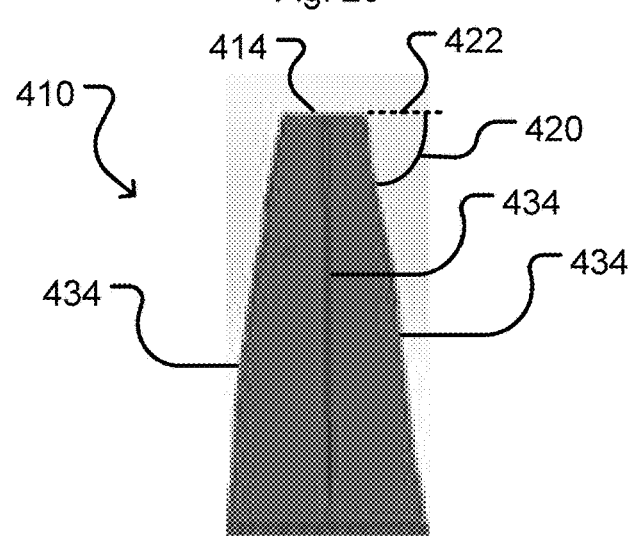
FIG. 27 is a close up front view of a collimator of a light guide according to the embodiment shown in FIG. 25.
Figure 28:
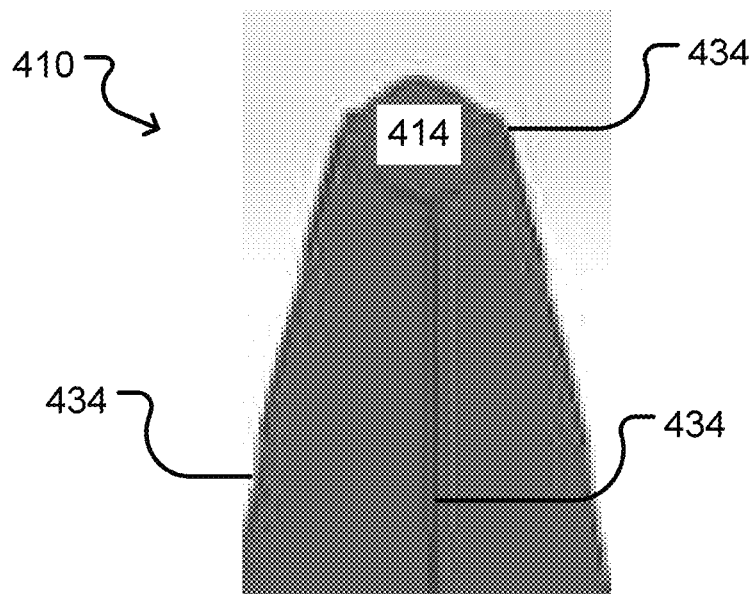
FIG. 28 is a close up partial top isometric view of a collimator of the light guide according to the embodiment shown in FIG. 25.
Figure 29:
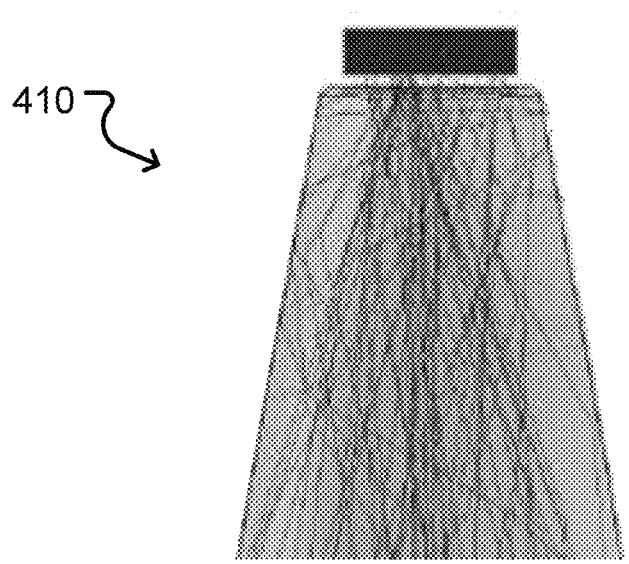
FIG. 29 is a close up partial front view of a light source and a collimator of a light guide according to the embodiment shown in FIG. 25 with exemplary simulated light ray traces.
Figure 30:
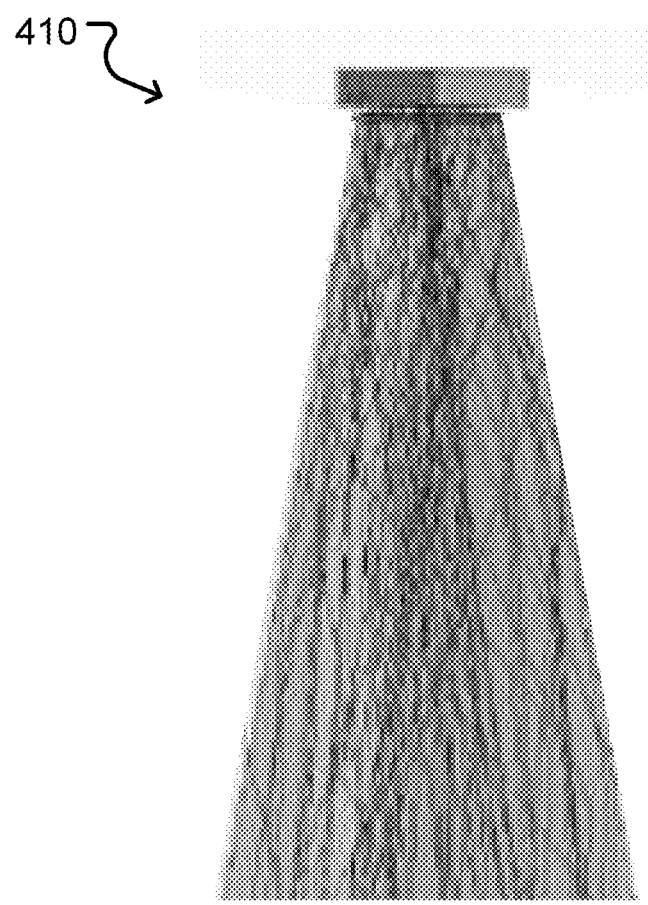
FIG. 30 is a front view of a light source and a collimator of a light guide according to the embodiment shown in FIG. 25 with exemplary simulated light ray traces.
Figure 31:
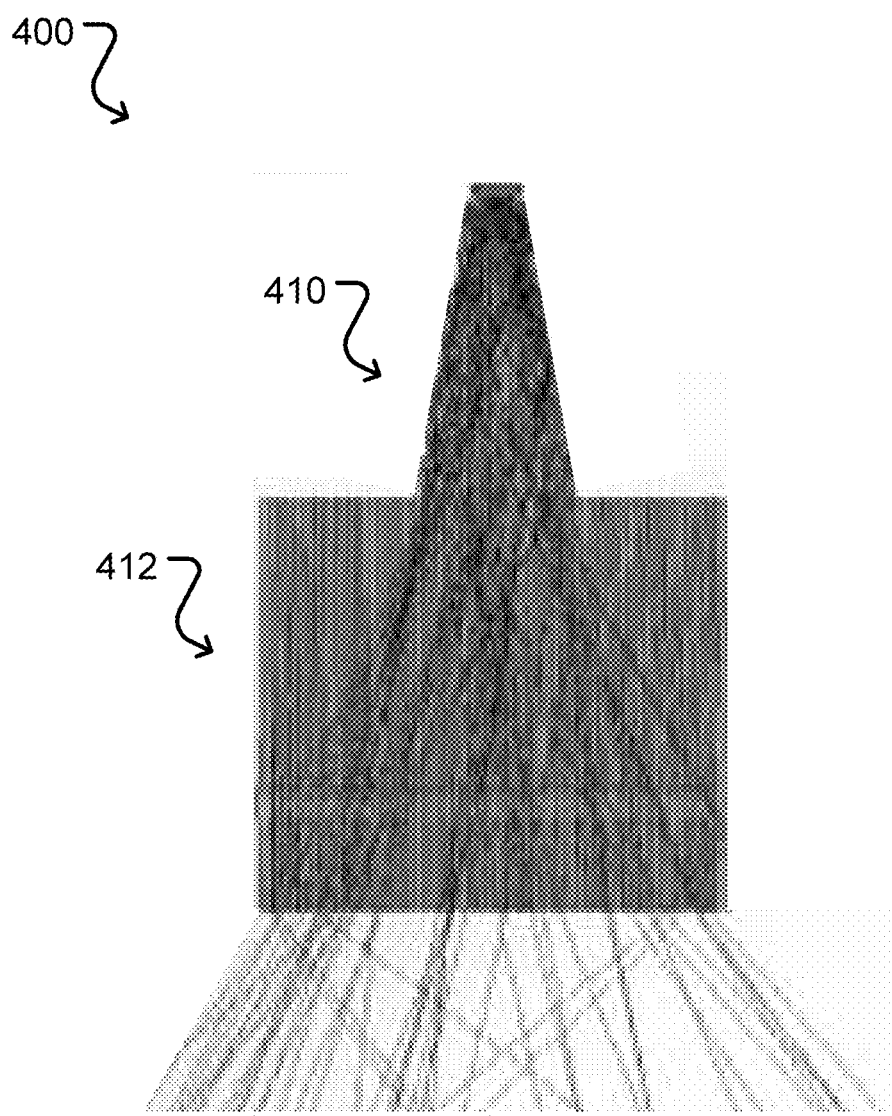
FIG. 31 is a front view of a light source and a light guide according to the embodiment shown in FIG. 25, showing for purposes of illustration a single collimator with exemplary simulated light ray traces.
Figure 32:
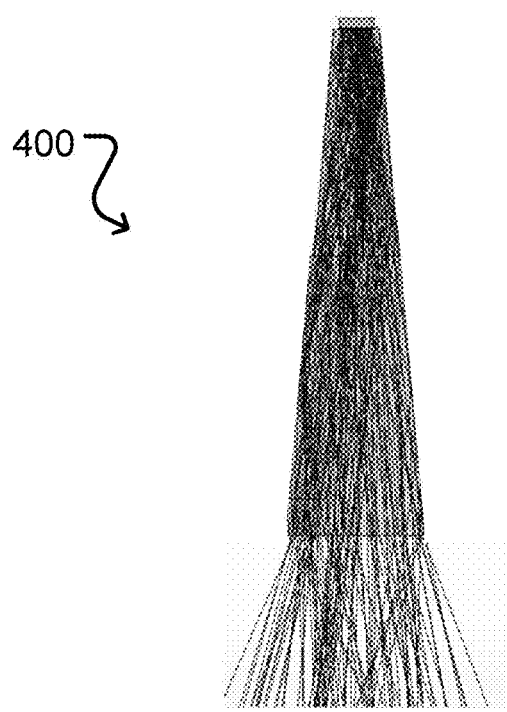
FIG. 32 is an cross sectional side view of a light source and a light guide according to the embodiment shown in FIG. 25, with exemplary simulated light ray traces.

Light guide 100 is shown with two collimators 110 to conveniently illustrate details. In most embodiments the light guide has a base that would be more elongated laterally (either linearly or in any other manner), and would comprise a correspondingly greater number of collimators, for example to provide sufficient length for the light guide to conform to a desired shape and size of the luminaire (e.g. the embodiments shown in FIGS. 5, 15 and 25). Light guides of the present invention, viewed from above or below, may be linear, curved, circular, polygonal or any other open or closed shape. In some embodiments, the light guide may have at least 20, or at least 40, or at least 60 or at least 80, or at least 100, collimators. In some embodiments a plurality of identically-shaped and/or differently-shaped light guides may be combined to the desired shape and size of the luminaire.

Collimators 110 may be identical in size and shape. Collimator 110 has a rectangular frustum shape that expands laterally outwardly in a distal direction 117. The four sides of collimator 110 comprise a pair of opposing first faces 116, 116' and a pair of second side faces 118, 118'.

Figure 4:
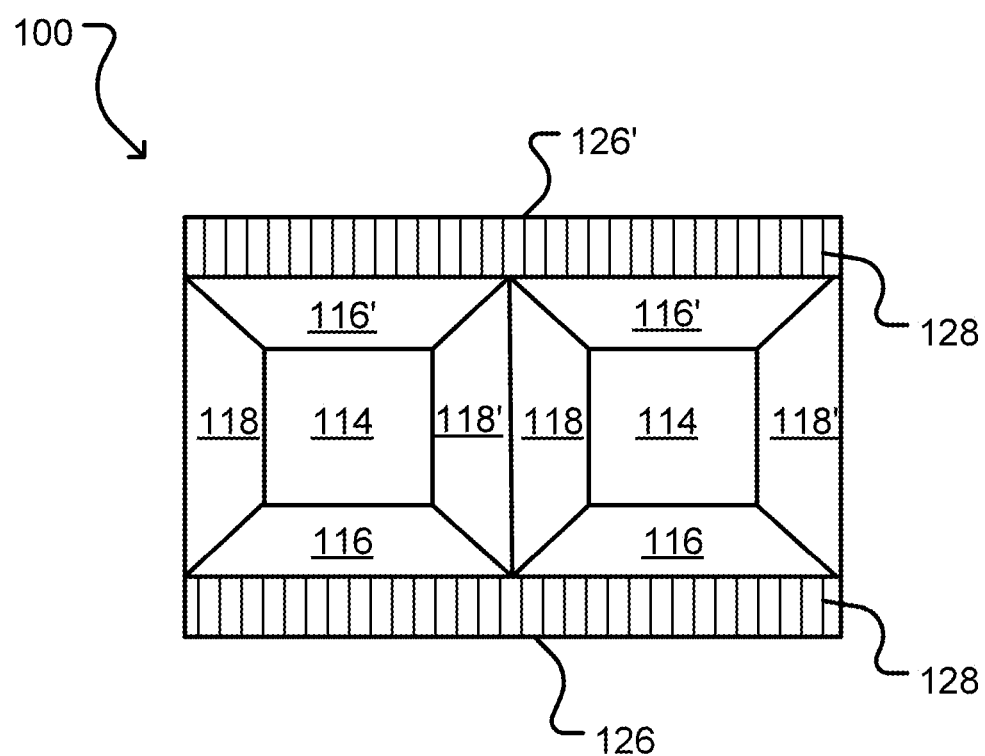
FIG. 4 is a top view of a light guide according to the embodiment shown in FIG. 1.

FIG. 1 shows the angle 120 of second faces 118, 118' relative to a plane 122 defined by light receiving surface 114. FIG. 4 shows the angle 124 of first faces 116, 116' relative to a plane 122 defined by light receiving surface 114. Angles 120 and 124 may be affected by a number of factors including:

Collimator path length. Depending on the specific goal of the design, a longer path length of the collimator would allow for more collimation and angles 120 and 124 would be adjusted accordingly.

Mechanical aperture of the exit surface. If one of the directions has a narrower housing aperture that the light is exiting from, that direction's collimation would need to be stronger to prevent light from being cut off.

Desired beam output. Where the luminaire/light guide is linear, it may be desirable to have a batwing beam pattern form along the width (controlled by angle 124) but a tighter beam pattern along the length to reduce the glare for the occupants (controlled by angle 120).

Manufacturing constraints. Even if an angle of 90 degrees is desired, a minimum draft angle may be needed for manufacturing such as injection molding.

In some embodiments, angles 120 and 124 are not equal. This may be due to the path length difference between the two orientations caused by base 112, that is, light affected by angle 124 experiences more reactions (interacting with first surfaces 116, 116' and major surfaces 126, 126') while light affected by angle 120 primarily only interacts with second surfaces 118, 118'.

In some embodiments angle 120 may range from 82 to 89.9 degrees, or from 80 to 89.9 degrees, or from 75 to 89.9 degrees. In some embodiments angle 124 may range from 80 to 89.9 degrees. In some embodiments angle 120 and angle 124 are identical. In other embodiments angle 120 and angle 124 differ.

Base 110 is rectangular and laterally elongated, for example in a manner dictated by the desired shape of the luminaire, that is, linear, curved, circular, polygonal or any other open or closed shape. Base 110 has opposing major faces 126, 126' with longitudinally extending flutes 128. Major faces 126, 126' of base 110 may be continuous with, and may be at least partially coplanar with, corresponding first faces 116, 116' of collimators 110.

In operation, substantially all light received at light receiving surface 114 travels by total internal reflection through collimators 110 and base 112 before refracting out of light emitting surface 111. Light internally reflects through collimators 110 at progressively lower angles. Higher angle light travelling through collimators 110 are reflected a greater number of times than lower angle light. Since each reflection bends light a small amount toward a lower angle, higher angle light experiencing more reflections will be bent more toward lower angles than light initially received at lower angles. Thus light reflecting through collimators 100 ends up at similar angles below the glare zone as the light refracts out of light emitting surface 111. Some lower angle light may not experience any internal reflections within light guide 100.

Flutes 128 on major faces 126, 126' of base 112 homogenize light, as described for example in U.S. Pat. No. 10,215,344, incorporated by reference herein in its entirety. Since flutes 128 are contoured in directions (e.g. for FIG. 1, into and out of the page) which are perpendicular to the internal reflections by collimators 110, the effect of flutes 128 does not significantly interfere with the glare control effect of collimators 110. Texture elements 130 at light emitting surface 111 further homogenize light exiting light guide 100, as well as homogenizes the appearance of light emitting surface 111.

FIGS. 5 to 9 show a light guide 200 according to an embodiment of the invention. Light guide 200 extends laterally in a semi-circular shape. In an example embodiment, two light guides 200 can be combined to form an annulus light guide for an annular luminaire. In some embodiments light guide 200 may extend laterally in any other length or shape.

Light guide 200 is similar to light guide 100 but is an example embodiment configured to emit a wide distribution. In some embodiments the wide distribution may be at least 50 degrees. In particular, light receiving surface 214 of light guide 200 has a plurality of V-shaped grooves 215. The embodiment illustrated in FIGS. 5 to 9 has 2 V-shaped grooves 215. In other embodiments, light receiving surface 214 may have 3 or more V-shaped grooves 215. V-shaped grooves 215 may span the entirety of light receiving surface 214. V-shaped grooves 215 may run normal to the plane of first faces 216, 216' of collimator 210. In other embodiments, V-shaped grooves 215 may run parallel to the plane of first faces 216, 216' of collimator 210.

In some embodiments, as shown in FIG. 5A, V-shaped grooves 215 may be provided with flutes 217 running perpendicular to the direction in which V-shaped grooves 215 run.

Light guide 200 also includes longitudinally extending flutes 232 on first faces 216, 216' of collimator 210. Flutes 232 of collimators 210 may be continuous with corresponding flutes 228 of base 212.

Second faces 218, 218' of collimator 210 expand laterally in a stepped manner at a plurality of opposing steps 230. Steps 230 along each second face 218, 218' may be identical in shape and spaced equally apart. In some embodiments, angle 220 may be 82 to 89.9 degrees.

The inventors have determined that V-shaped grooves 215 split directional light from an light emitting diode (LED) into internally reflected batwing distributions parallel to light guide 200's lateral extent (e.g. circumference in the case of light guide 200's particular shape). Light from LEDs comprises various colours (i.e., wavelengths) depending on where it leaves the phosphor face of the LED. In particular, the colour transitions from cool to warm from the center to the edges of the phosphor face of the LED. Different sides of the "V" of V-shaped grooves 215 can operate on different areas of the phosphor face. For example, in the illustrated embodiment of a double "V", the two inner sides of the "VV" create a cooler batwing distribution flanked by the two outer sides of the "VV" which create a warmer batwing distribution. The cooler and warmer batwing distributions mix inside light guide 100 to homogenize the colours. Flutes 217 provide further homogenization of the colours.

The inventors have determined that, since the contours of flutes 228 of base 212 and flutes 232 of collimator 210 run perpendicular to the contours of V-shaped grooves 215, flutes 228, 232 provide additional homogenization of the optical distribution in a normal direction to V-shaped grooves 215.

The inventors have determined that steps 230 of collimators 210 provide at least three functions: (i) to divide sections of light guide 200 into smaller, thin rectangular sections to eliminate the visual appearance of louver sections on light emitting surface 211 created by the imaging of individual collimators 210; (ii) to allow angles of each such section to be independently specified to optimize the optical distribution which runs parallel to light guide 200's lateral extent; and (iii) to control light rays so that collimators 210 turn on and off similar angles through the entire extent of collimators 210, minimizing intermittent "drop outs" along the lateral extent of light guide 200.

FIGS. 9 to 12 illustrate exemplary simulated ray traces of light of multiple ray reactions. Rays are shown to internally reflect down to lower angles in the proximal to distal direction. Lower angle rays typically reflect once while higher angle rays are reflected multiple times. Each reflection results in the rays bending to lower angles.

Figure 13:
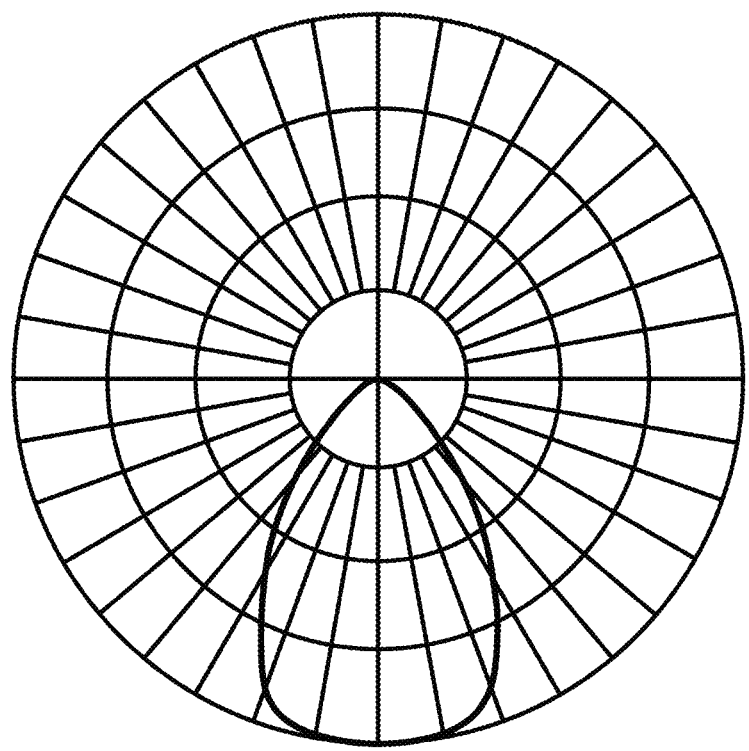
FIG. 13 is an optical distribution plot of exemplary simulated light rays emitted from a light guide according to the embodiment shown in FIG. 5.
Figure 14A:
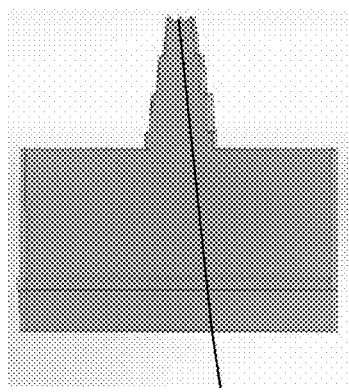
FIGS. 14A to 14H show exemplary simulated ray traces of light internally reflecting and then refracting out a light guide according to the embodiment shown in FIG. 5, when a single light ray enters the light receiving surface at the following incident angles: 14A at 0 degrees, 14B at 10 degrees, 14C at 20 degrees, 14D at 30 degrees, 14E at 40 degrees, 14F at 50 degrees, 14G at 60 degrees and 14H at 70 degrees.
Figure 14B:
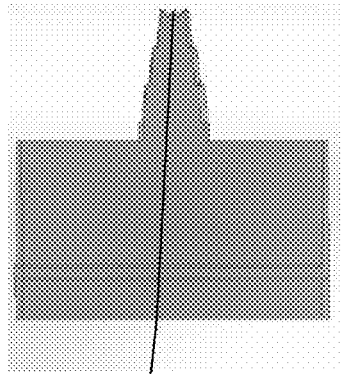
Figure 14C:
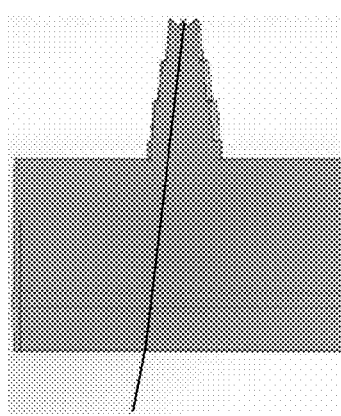
Figure 14D:
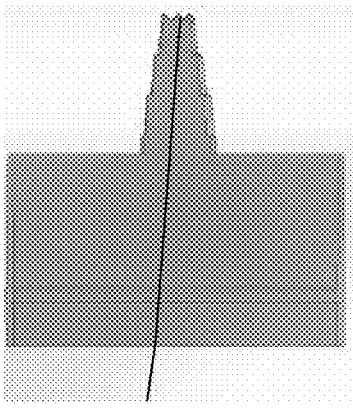
Figure 14E:
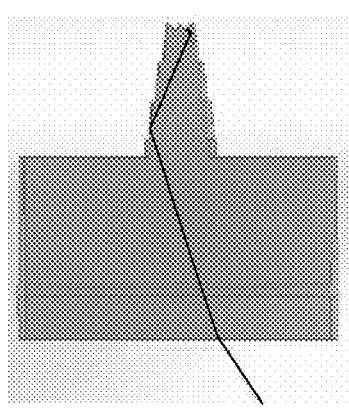
Figure 14F:
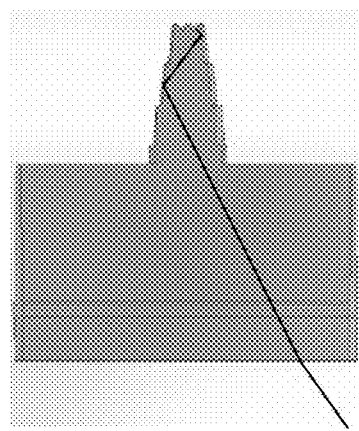
Figure 14G:
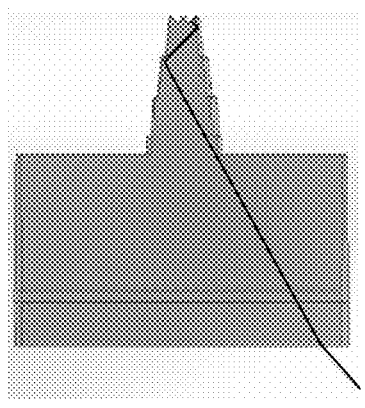
Figure 14H:
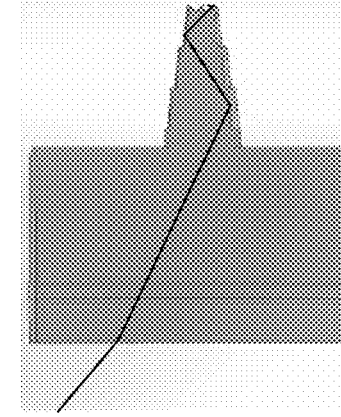

The optical distribution of these reactions is plotted in FIG. 13, showing a desirable distribution with peak angles at approximately 10 to 20 degrees for a wide distribution.

FIGS. 14A to 14H show exemplary simulated ray traces of light emitted from light guide 200 of a single ray reaction, where the ray enters light guide 200 from various angles from 0 to 70 degrees. From 0 to 30 degrees (FIGS. 14A to 14D), the light ray is refracted at the light receiving surface at inner sides of the "VV" grooves and travels down the light guide until it refracts out of the light emitting surface. From 40 to 70 degrees (FIGS. 14E to 14H), the light ray is refracted at the light receiving surface at outer sides of the "VV" grooves, causing the ray to enter light guide 100 at a higher angle. As this angle is higher, the ray internally reflects multiple times within the collimator, reducing its angle, and then refracts out of the light emitting surface.

FIGS. 15 to 18 show a light guide 300 according to an embodiment of the invention. Light guide 300 is similar to light guide 200 but is an example embodiment configured to emit a medium distribution. In some embodiments the medium distribution may be approximately 30 to 50 degrees.

In particular, light receiving surface 314 of light guide 300 has a flat surface. The inventors have determined that V-shaped grooves are not necessary for a medium distribution because a medium distribution does not require light to be redirected or spread at the light receiving surface. With a flat surface, light maintains a Lambertian distribution as it enters light receiving surface 314.

Like light guide 200, light guide 300 has a plurality of collimators 310 with first faces 316, 316', second faces 318, 318', collimator steps 330 and collimator flutes 332. In some embodiments, angle 320 may be 80 to 89.9 degrees. Light guide 300 also has a base 312 with light emitting surface 311 and flutes 328.

FIGS. 19 to 22 illustrate exemplary simulated ray traces of light of multiple ray reactions. Rays are shown to internally reflect down to lower angles in the proximal to distal direction. Lower angle rays typically reflect once while higher angle rays are reflected multiple times. Each reflection results in the rays bending to lower angles.

Figure 23:
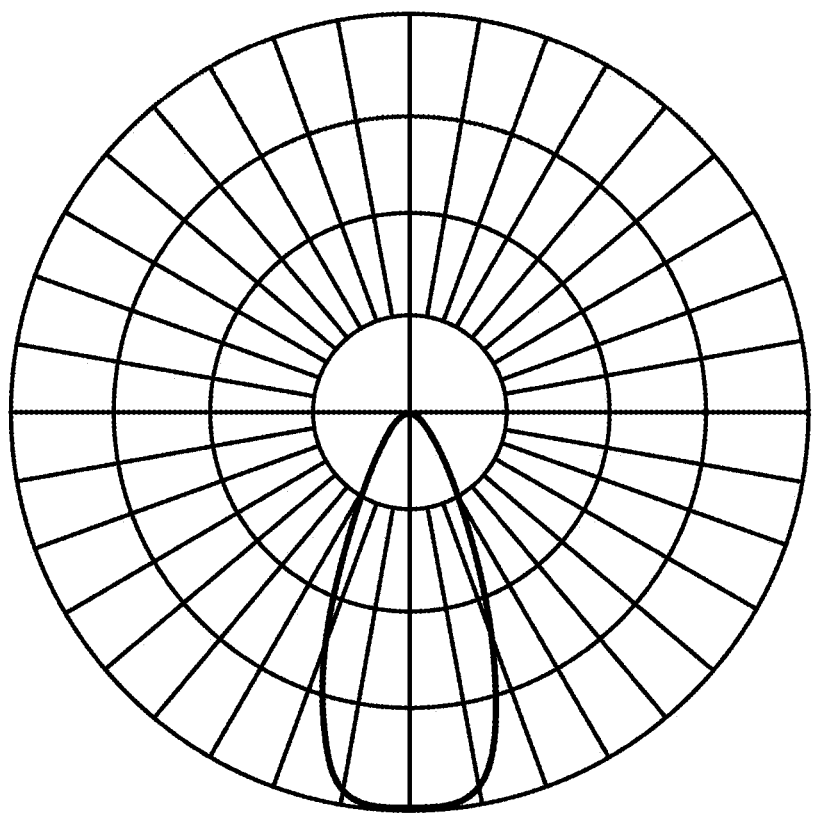
FIG. 23 is an optical distribution plot of exemplary simulated light rays emitted form a light guide according to the embodiment shown in FIG. 15.
Figure 24A:
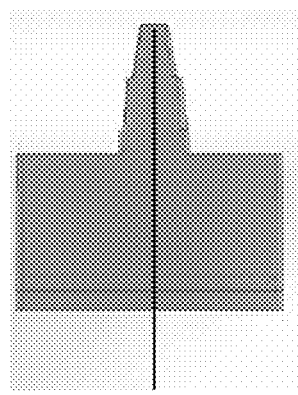
FIGS. 24A to 24H show exemplary simulated ray traces of light internally reflecting and then refracting out a light guide according to the embodiment shown in FIG. 15, when a single light ray enters the light receiving surface at the following incident angles: 24A at 0 degrees, 24B at 10 degrees, 24C at 20 degrees, 24D at 30 degrees, 24E at 40 degrees, 24F at 50 degrees, 24G at 60 degrees and 24H at 70 degrees.
Figure 24B:
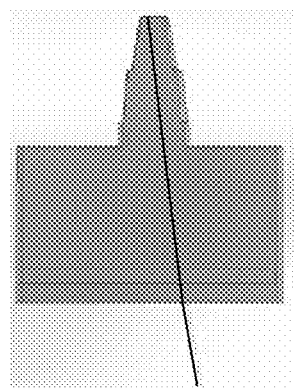
Figure 24C:
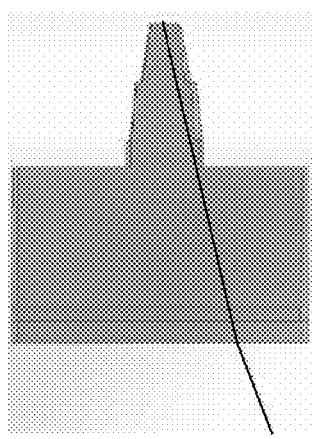
Figure 24D:
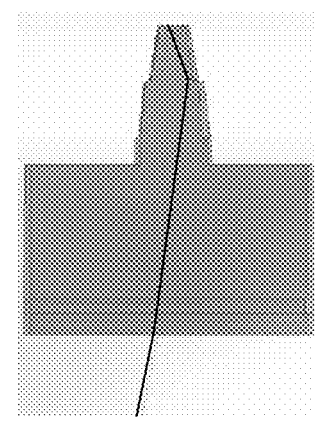
Figure 24E:
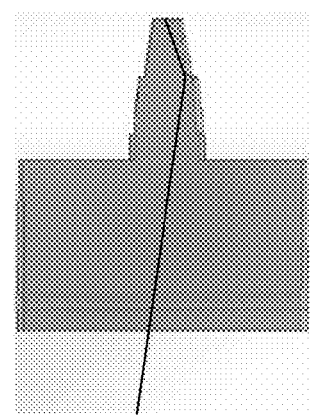
Figure 24F:
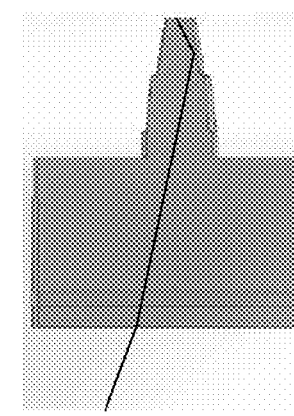
Figure 24G:
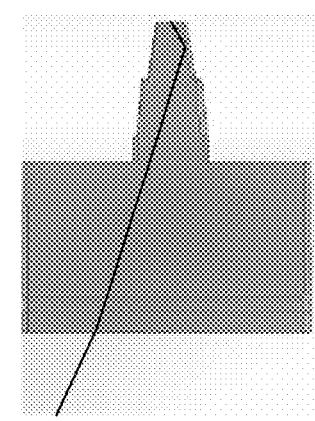
Figure 24H:
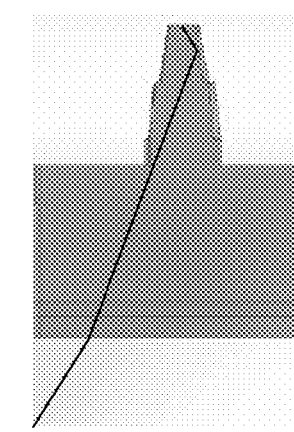

The optical distribution of these reactions is plotted in FIG. 23, showing a desirable distribution with peak angles at approximately zero to 10 degrees for a medium distribution.

FIGS. 24A to 24H show exemplary simulated ray traces of light emitted from light guide 200 of a single ray reaction, where the ray enters light guide 300 from various angles from 0 to 70 degrees. From 0 to 20 degrees (FIGS. 24A to 24C), the light ray is refracted at the light receiving surface and travels down the light guide until it refracts out of the light emitting surface. From 30 to 70 degrees (FIGS. 24D to 24H), the ray to enter light guide 200 at a higher angle such that it internally reflects within the collimator, reducing the angle, and then refracts out of the light emitting surface.

FIGS. 25 to 28 show a light guide 400 according to an embodiment of the invention. Light guide 400 is similar to light guides 200 and 300 but is an example embodiment configured to emit a narrow distribution of approximately 20 to 30 degrees.

Similar to light guide 300, light receiving surface 414 of light guide 400 has a flat surface instead of V-shaped grooves. To ensure a narrow distribution and maximize collimation, collimator 410 lacks the flutes and steps of light guides 200 and 300. Also unlike light guides 100, 200 and 300, collimators 410 are arranged not in a side-by-side immediately adjacent manner but rather a corner edge by corner edge immediately adjacent manner. In some embodiments, angle 320 may be 75 to 89.9 degrees. Longitudinal corners or edges 434 of collimator 410 are rounded to reduce distances between diagonal reflections in collimator 410, creating more reflections and more collimation as a result. Major faces 426, 426' of base 412 have longitudinally extending flutes 428 to increase homogeneity of the exiting light.

FIGS. 29 to 32 illustrate exemplary simulated ray traces of light of multiple ray reactions. Rays are shown to internally reflect down to lower angles in the proximal to distal direction. Lower angle rays typically reflect once while higher angle rays are reflected multiple times. Each reflection results in the rays bending to lower angles.

Figure 33:
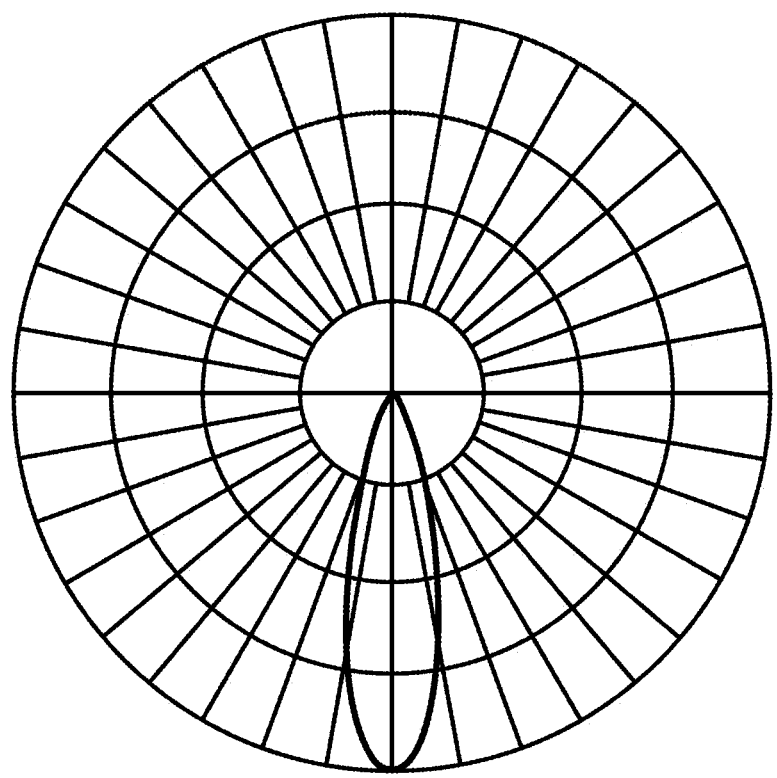
FIG. 33 is an optical distribution plot of exemplary simulated light rays emitted form a light guide according to the embodiment shown in FIG. 25.
Figure 34A:
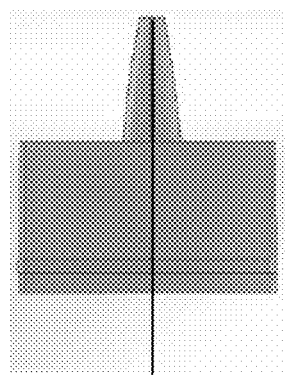
FIGS. 34A to 34H show exemplary simulated ray traces of light internally reflecting and then refracting out a light guide according to the embodiment shown in FIG. 25, when a single light ray enters the light receiving surface at the following incident angles: 34A at 0 degrees, 34B at 10 degrees, 34C at 20 degrees, 34D at 30 degrees, 34E at 40 degrees, 34F at 50 degrees, 34G at 60 degrees, 34H at 70 degrees and 34I at 80 degrees.
Figure 34B:
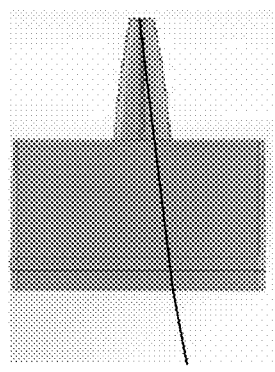
Figure 34C:
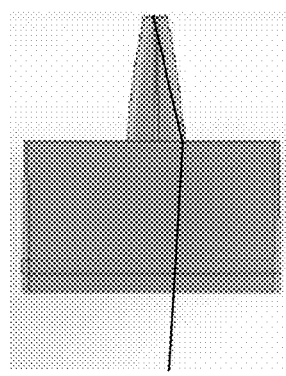
Figure 34D:
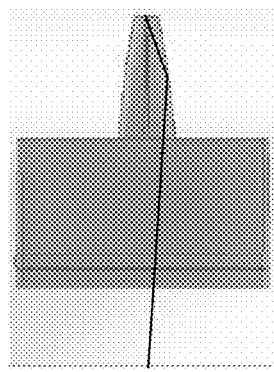
Figure 34E:
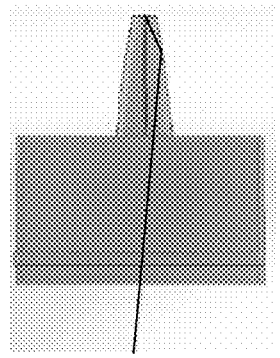
Figure 34F:
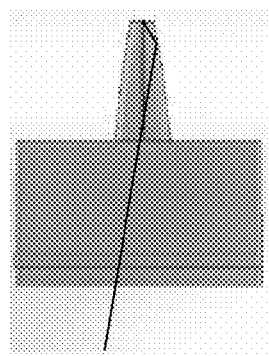
Figure 34G:
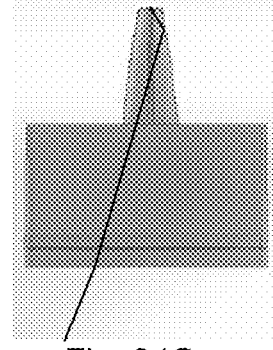
Figure 34H:
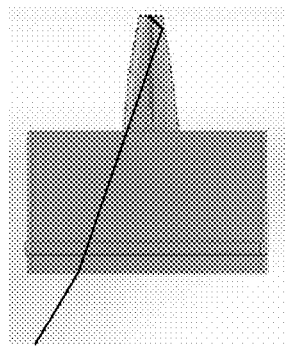
Figure 34I:
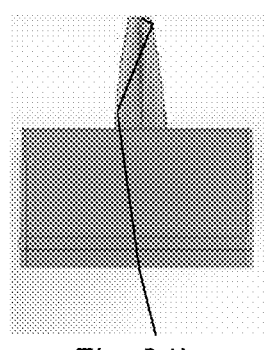

The optical distribution of these reactions is plotted in FIG. 33, showing a desirable distribution with an approximately zero degree peak angle for a narrow distribution.

FIGS. 34A to 34I show exemplary simulated ray traces of light emitted from light guide 400 of a single ray reaction, where the ray enters light guide 400 from various angles from 0 to 80 degrees. For 0 and 10 degrees (FIGS. 34A and 346), the light ray is refracted at the light receiving surface and travels down the light guide until it refracts out of the light emitting surface. From 20 to 80 degrees (FIGS. 34C to 34I), the ray to enter light guide 400 at a higher angle such that it internally reflects at least once within the collimator, reducing the angle, and then refracts out of the light emitting surface.

Figure 35:
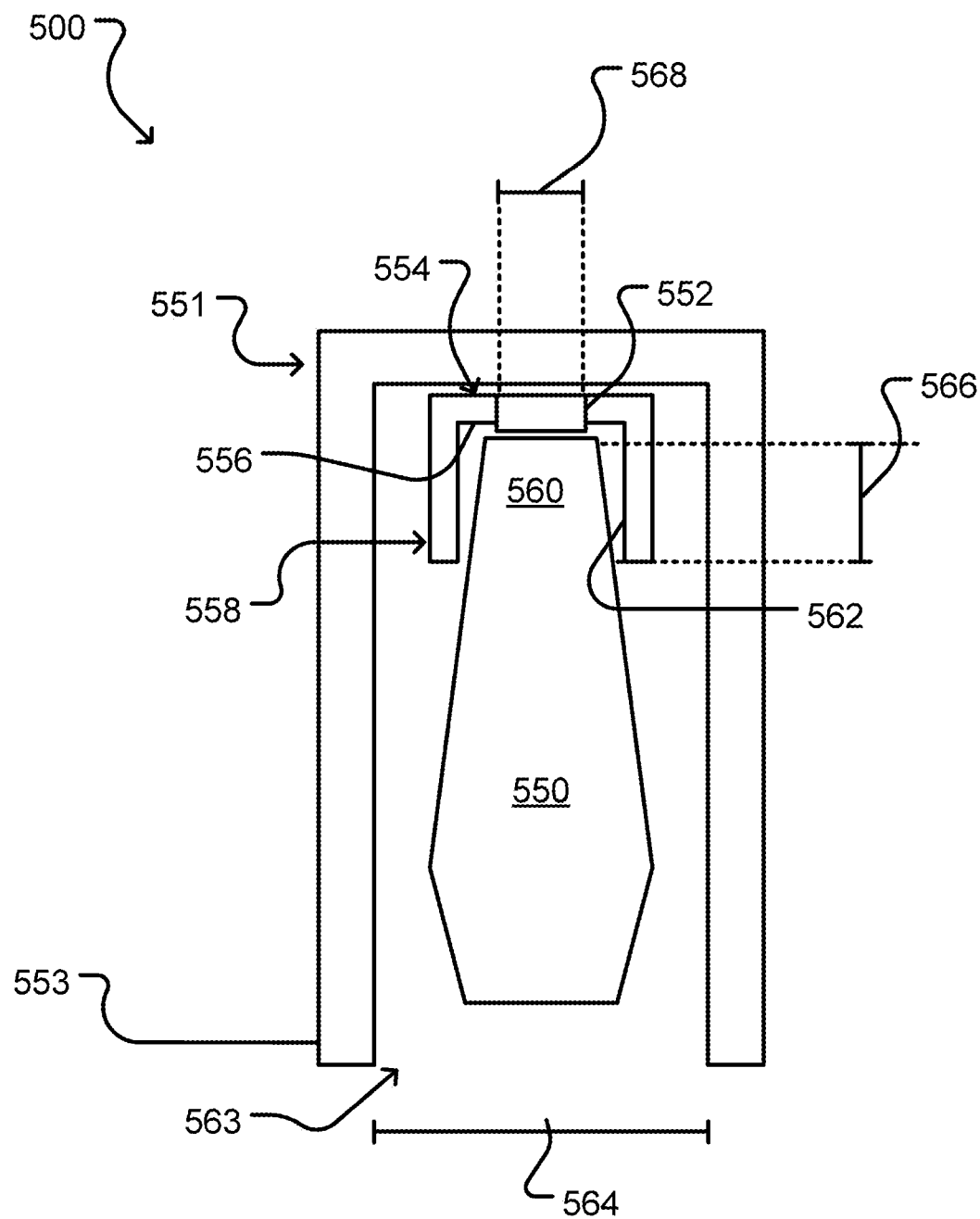
FIG. 35 shows a cross sectional side view of a luminaire according to an embodiment.

FIG. 35 shows a narrow aperture luminaire 500 according to an embodiment. Luminaire 500 has a housing 551 that houses a light guide 550. Light guide 550 may be any light guide according to the present invention, including for example light guide 100, 200, 300 or 400. Housing 551 has distal walls 553 that may act as baffle to absorb or otherwise block any high angle light leaving the light emitting surface of light guide 550. In example embodiments, aperture 563 of housing 551 may have a width 564 ranging from 10 mm to 70 mm.

Point light sources 552 are mounted on board 554. Point light sources 552 may be LEDs, and configured for optical communication with the light receiving surface of light guide 550. Board 554 has an inner surface 556 that may be reflective to collect stray light from a proximal region 560 of light guide 550 and reflect it back into light guide 550.

Baffle 558 is positioned to laterally surround proximal region 560 of light guide 550. Baffle 558 has an inner surface 562 that may absorb stray light from proximal region 560. For example, high angle light that would otherwise result in high angle glare may be blocked by baffle 558. Baffle 558 may be configured to conform to the shape of, and when in position contact, the lateral sides of proximal region 560 of light guide 550. In other embodiments there may be space between baffle 558 and proximal region 560. Baffle 558 extends distally a distance 566 along proximal region 560 of light guide 550. In some embodiments, the ratio of distance 566 to width 568 of light source 552 may range from 2:1 to 5:1.

Figure 36:
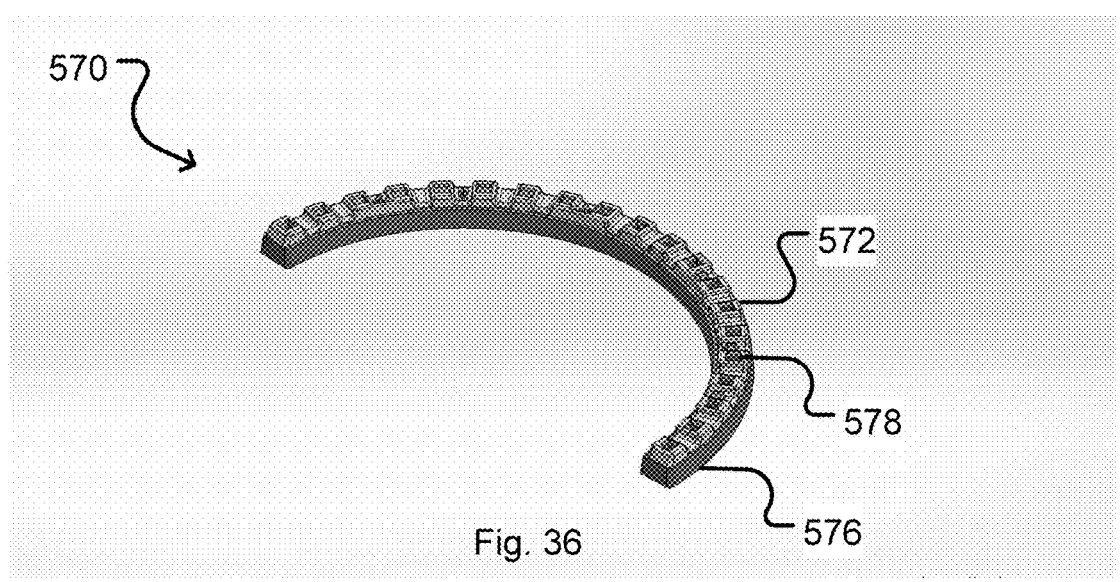
FIG. 36 is a top isometric view of an integral baffle board according to an embodiment.
Figure 37:
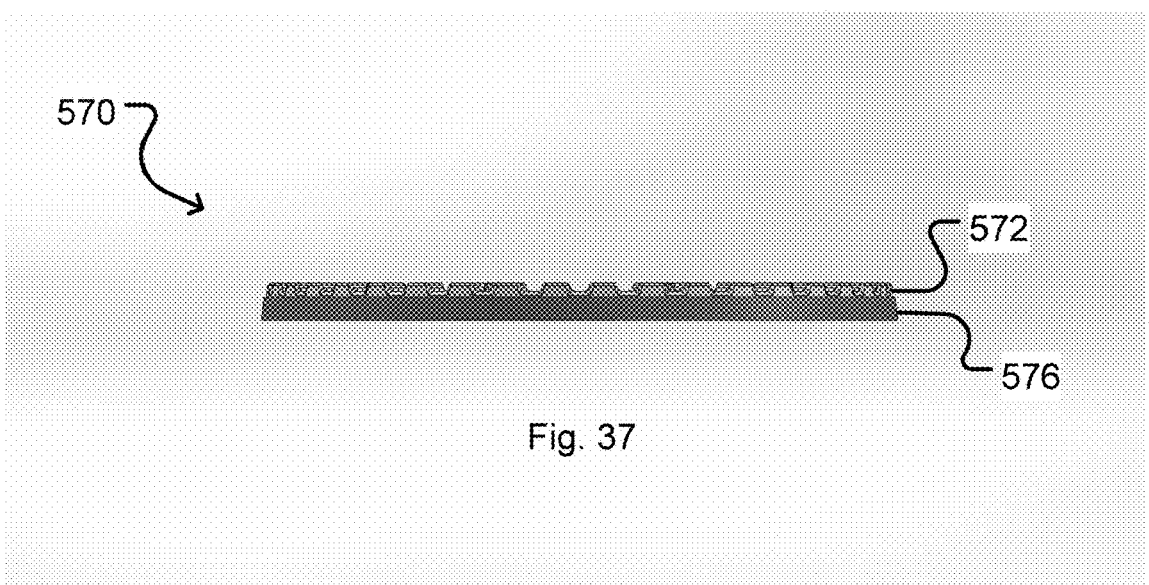
FIG. 37 is a side view of an integral baffle board according to the embodiment of FIG. 36.
Figure 38:
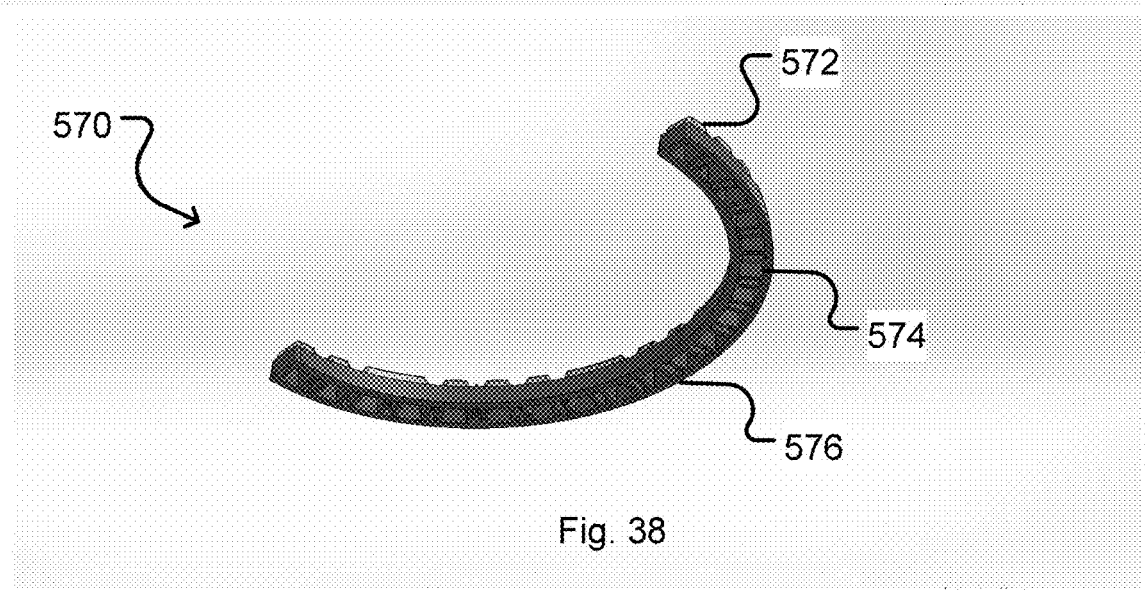
FIG. 38 is a bottom isometric view of an integral baffle board according to the embodiment of FIG. 36.

FIGS. 36 to 38 show an integrally formed baffle board 570 shaped to correspond to light guides 200, 300 and 400. In other embodiments baffle board 570 may be any other shape that corresponds to a corresponding light guide. Baffle portion 572 has a plurality of hollow elements 574 for surrounding corresponding proximal regions of a plurality of collimators of the light guide. In some embodiments, hollow elements 574 may be shaped as hollow rectangular frustums.

Baffle portion 572 is made of a dark-coloured (e.g. black) material to absorb stray light from a proximal region of the light guide. Board portion 576 has a plurality of apertures 578 for mounting corresponding point light sources. Board portion 576 is made of a light-coloured (e.g. white) material to reflect stray light back into the light guide.

In some embodiments, such as that illustrated in the embodiments, the baffle may be integrally formed with the board. In other embodiments, the baffle and board may be distinct components.

Figure 41:
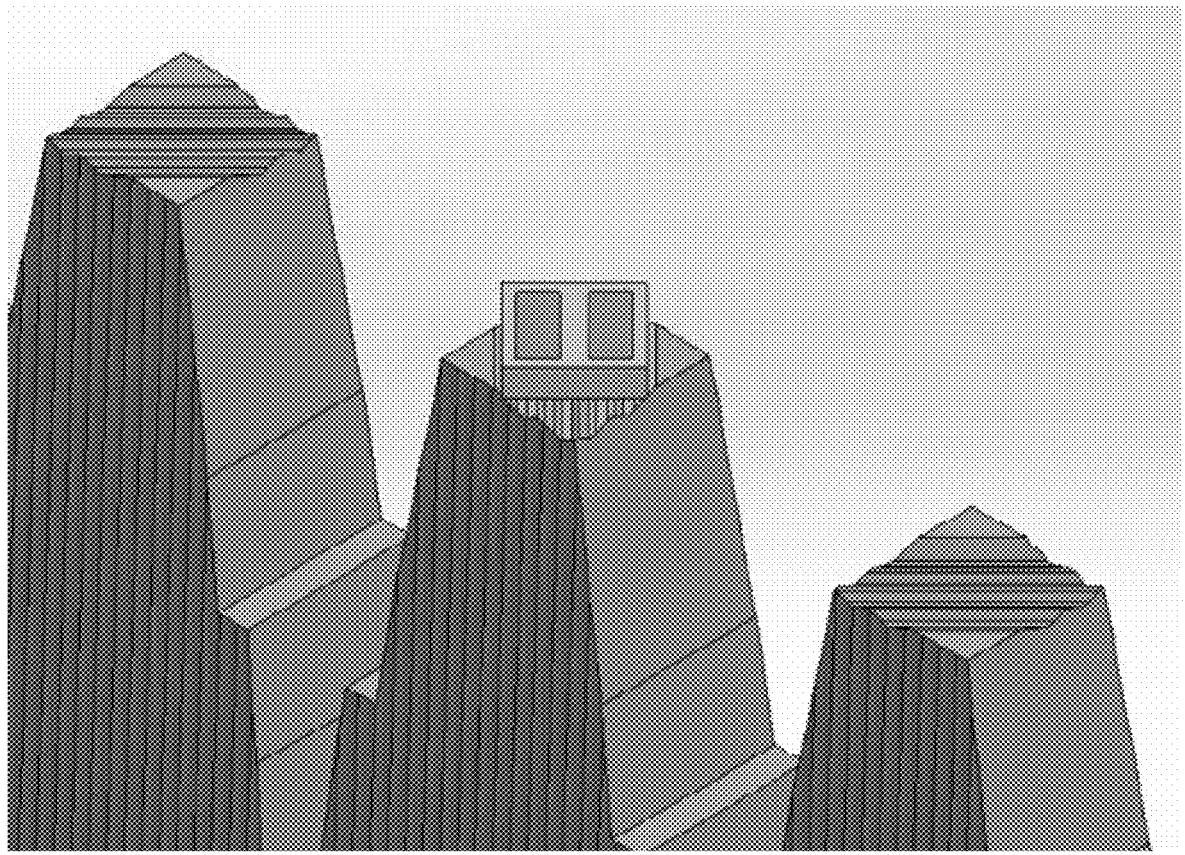
FIG. 41 is a close up partial top isometric view of a plurality of collimators of a light guide according to an embodiment.

The above describe certain embodiments of the invention. Other embodiments are possible. For example, in some embodiments:
  the major faces of the base are smooth, i.e., do not comprise flutes;

the collimators in a side-by-side immediately adjacent arrangement are interconnected at their distal end, so that the distal ends comprise the light emitting surface, i.e., the light guide does not have a base;

the collimators and the base may be formed separately and then combined in a manner that permits optical communication between them;

the collimators may not be uniform in shape and/or size;

the collimators may be in the shape of a conical frustum (i.e., truncated cone);

the collimators expand laterally only along the second faces and not the first faces (i.e., angle 124 is 90 degrees);

the second faces of the collimators may be fluted;

the collimators may be configured to accommodate more than one light source; and the V-shaped grooves may run in directions other than parallel or perpendicular to the first faces of the collimator, and may not span the entirety of the proximal end of the collimator. For example, FIG. 41 shows another embodiment where the V-shaped grooves run in alternating 45 degree angles to the first faces. The light source is also oriented in a corresponding manner. Different angles may be possible depending for example on the shape of the light source (e.g. a rectangular LED instead of a square LED). Note for FIG. 41 that the light source is shown only with the middle collimator for illustrative purposes.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

The invention claimed is:

1. A luminaire comprising:
   at least one light guide comprising:
      an elongated base comprising a light emitting surface at a distal end, and opposing major faces; and
      a plurality of collimators arranged in an adjacent manner and projecting in a proximal direction from the base, wherein each collimator comprises a light receiving surface at a proximal end, wherein each collimator expands laterally outwardly in a distal direction, and
      whereby substantially all light received at the light receiving surfaces internally reflects
      through the collimators and the base and emits from the light emitting surface;
   a plurality of light sources in optical communication with the light receiving surfaces;
   a board onto which the plurality of light sources are mounted;
   a housing for housing the light guide, the plurality of light sources, and the board;
   wherein the housing comprises sidewalls that distally extend beyond a plane defined by the light emitting surface.

2. The luminaire according to claim 1, comprising a baffle having a plurality of baffle elements, each baffle element laterally surrounding a proximal region of a corresponding collimator, wherein an inner surface of each baffle element comprise a light absorbing surface, wherein the light absorbing surface comprises a black surface or a reflective surface, wherein the board and baffle are integrally formed.

3. The luminaire according to claim 2 wherein the housing comprises an upside down U-shaped cross-section with an open distal end, the open distal end having a width of 10 mm to 70 mm, and wherein a ratio of a distance of the baffle element's distal extent along the proximal region of the corresponding collimator, to a width of the light source, is 2:1 to 5:1.

4. The luminaire according to claim 3 wherein the point plurality of light sources comprise light emitting diodes.

5. The luminaire according to claim 1, wherein the plurality of collimators are arranged in a side-by-side immediately adjacent manner along the base, wherein each collimator is shaped as a rectangular frustum comprising opposing first faces and opposing second faces, and wherein the first faces of the collimators are continuous with corresponding major faces of the base, and wherein the first faces of the collimators are at least partially coplanar with corresponding major faces of the base.

6. The luminaire according to claim 5, wherein a first angle defined by the first faces of the collimators relative to a plane defined by the light receiving surfaces of the collimators ranges from 82 to 89.9 degrees, or from 80 to 89.9 degrees, or from 75 to 89.9 degrees, and wherein a second angle defined by the second faces of the collimators relative to a plane defined by the light receiving surfaces of the collimators ranges from 80 to 89.9 degrees, wherein the first angle and the second angle are different.

7. The luminaire according to claim 5, wherein the first faces of the collimators comprise a plurality of longitudinally extending flutes, and wherein the second faces of the collimators comprise at least one pair of opposing steps.

8. The luminaire according to claim 5, wherein longitudinal edges between the first and second faces are rounded, and the plurality of collimators are arranged in a corner edge by corner edge immediately adjacent manner along the base, and wherein the light receiving surface is flat.

9. The luminaire according to claim 1, wherein the major surfaces of the base comprise a plurality of longitudinally extending flutes.

10. The luminaire according to claim 1, wherein the light emitting surface comprises texture elements selected from the group consisting of bumps, dimples, flutes, and cross-hatched flutes.

11. The luminaire according to claim 1, wherein the light receiving surface comprises a plurality of V-shaped grooves or two V-shaped grooves, wherein the V-shaped grooves comprise a plurality of flutes running normal to the direction in which the V-shaped grooves run, or wherein the V-shaped grooves run parallel or normal to the lateral extent of the base, or wherein the V-shaped grooves run diagonally to the lateral extent of the base in an alternating manner between adjacent collimators.

12. The luminaire according to claim 1, wherein the light receiving surface is flat.

13. The luminaire according to claim 1, wherein the plurality of collimators and base are integrally formed, and the plurality of collimators are identically sized and shaped.

* * * * *